United States Patent
Woo et al.

(10) Patent No.: US 9,628,703 B2
(45) Date of Patent: Apr. 18, 2017

(54) MOBILE TERMINAL AND CONTROLLING METHOD THEREOF

(71) Applicant: LG ELECTRONICS INC., Seoul (KR)

(72) Inventors: Sungmin Woo, Seoul (KR); Sungbum Joo, Seoul (KR); Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 709 days.

(21) Appl. No.: 13/966,922

(22) Filed: Aug. 14, 2013

(65) Prior Publication Data
US 2014/0049611 A1 Feb. 20, 2014

(30) Foreign Application Priority Data
Aug. 16, 2012 (KR) .................. 10-2012-0089729

(51) Int. Cl.
*H04N 5/232* (2006.01)
(52) U.S. Cl.
CPC ..... *H04N 5/23229* (2013.01); *H04N 5/23212* (2013.01)
(58) Field of Classification Search
CPC .......... H04N 5/23229; H04N 5/23212; H04N 5/23219; H04N 5/232
See application file for complete search history.

(56) References Cited

U.S. PATENT DOCUMENTS

| | | | |
|---|---|---|---|
| 8,736,706 B1* | 5/2014 | Valente | H04N 5/232 348/218.1 |
| 2008/0151075 A1 | 6/2008 | Park | |
| 2009/0213239 A1* | 8/2009 | Yoshida | H04N 5/232 348/222.1 |
| 2009/0310885 A1* | 12/2009 | Tamaru | H04N 5/23212 382/275 |
| 2010/0134642 A1* | 6/2010 | Thorn | G02B 7/287 348/222.1 |
| 2011/0182470 A1* | 7/2011 | Kim | H04N 13/0207 382/103 |
| 2011/0279709 A1 | 11/2011 | Nonaka et al. | |

(Continued)

FOREIGN PATENT DOCUMENTS

CN 101605208 A 12/2009
CN 101621622 A 1/2010
(Continued)

Primary Examiner — Brian Yenke
Assistant Examiner — Sean Haiem
(74) Attorney, Agent, or Firm — Birch, Stewart, Kolasch & Birch, LLP

(57) ABSTRACT

A mobile terminal including a camera configured to photograph a plurality of images; a touchscreen configured to display one of the plurality of the photographed images or a first synthetic image created from synthesizing at least two of the plurality of the photographed images together as a representative image; and a controller configured to receive a first touch input applied while the representative image is displayed, extract an image having a best resolution for an object or region selected by the first touch input from the plurality of the photographed images, and display the extracted image via the touchscreen.

20 Claims, 41 Drawing Sheets

(56) References Cited

U.S. PATENT DOCUMENTS

| | | | | |
|---|---|---|---|---|
| 2012/0249819 A1* | 10/2012 | Imai | ................... | H04N 9/045 |
| | | | | 348/222.1 |
| 2013/0038759 A1* | 2/2013 | Jo | ................... | H04N 5/2256 |
| | | | | 348/240.99 |
| 2013/0342734 A1 | 12/2013 | Georgis et al. | | |
| 2014/0009587 A1 | 1/2014 | Kim | | |

FOREIGN PATENT DOCUMENTS

| | | | |
|---|---|---|---|
| CN | 101888482 A | 11/2010 |
| CN | 102142141 A | 8/2011 |
| EP | 2355525 A2 | 8/2011 |
| JP | 2005-277813 A | 10/2005 |
| KR | 10-2008-0058779 A | 6/2008 |

\* cited by examiner

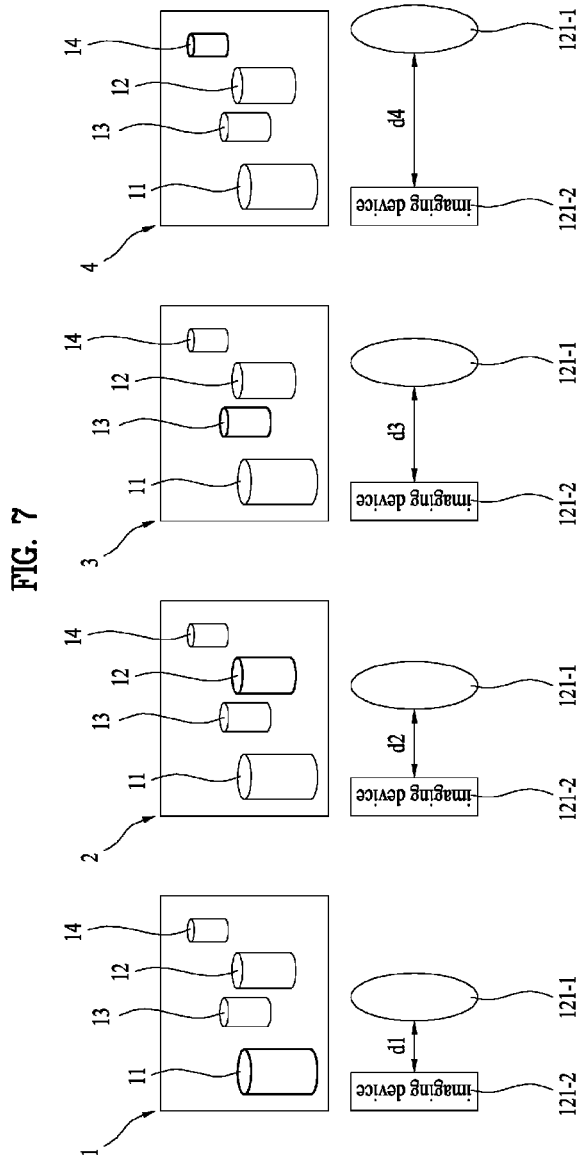

<Example of EXIF data>

1st object resolution: 10
2nd object resolution: 8
3rd object resolution: 6
4th object resolution: 4

<Example of EXIF data>

1st region resolution: 1
2nd region resolution: 1
3rd region resolution: 1
4th region resolution: 4

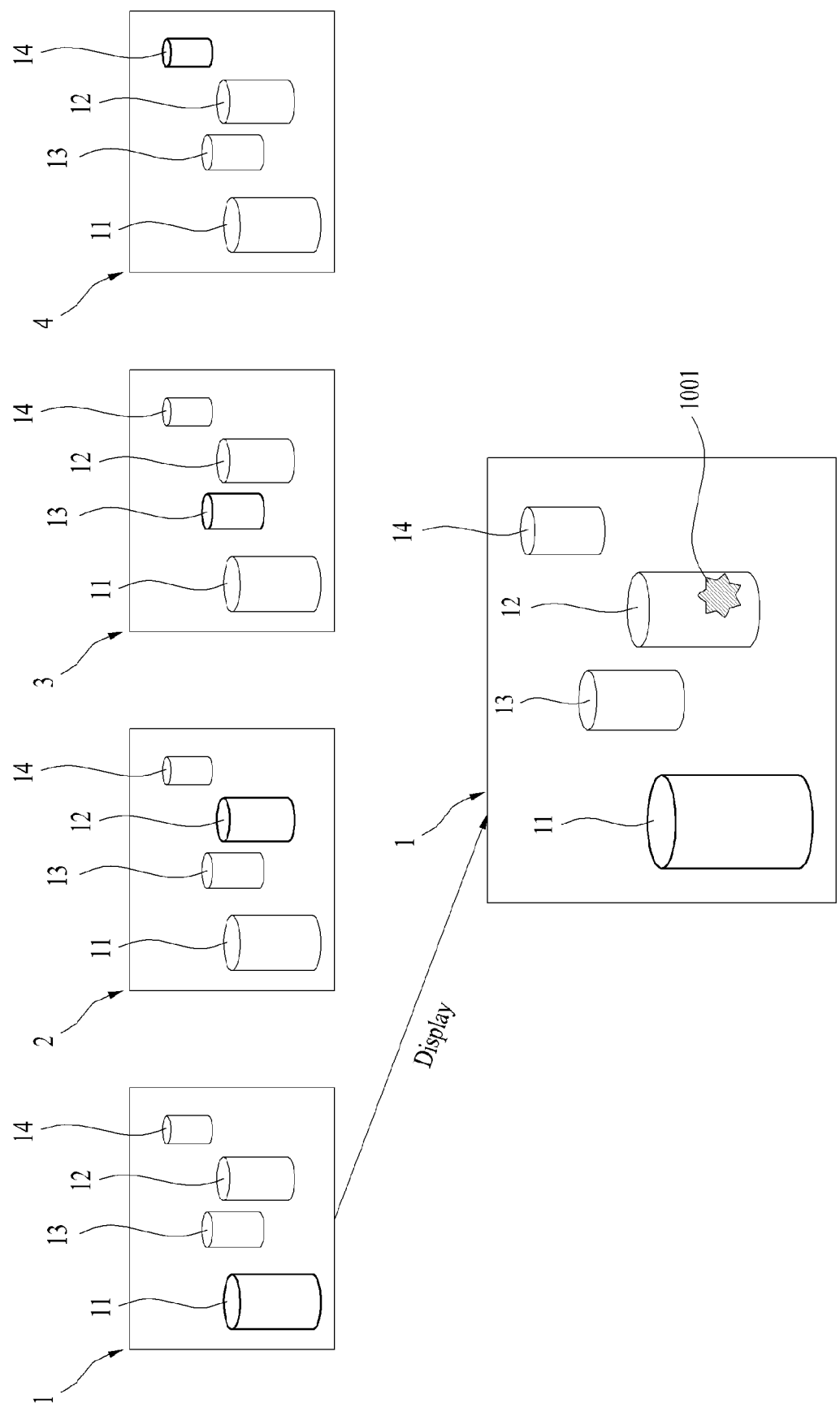

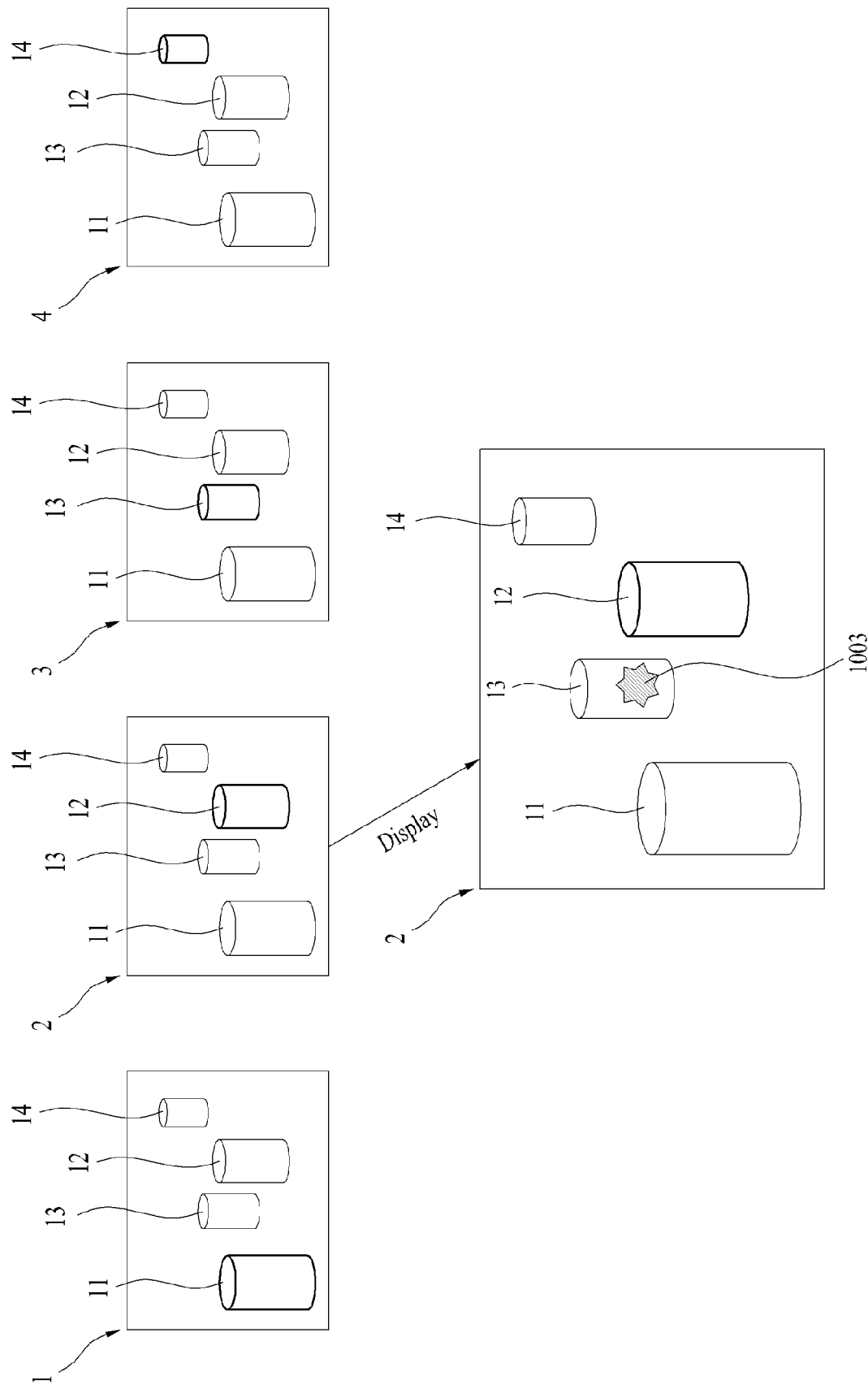

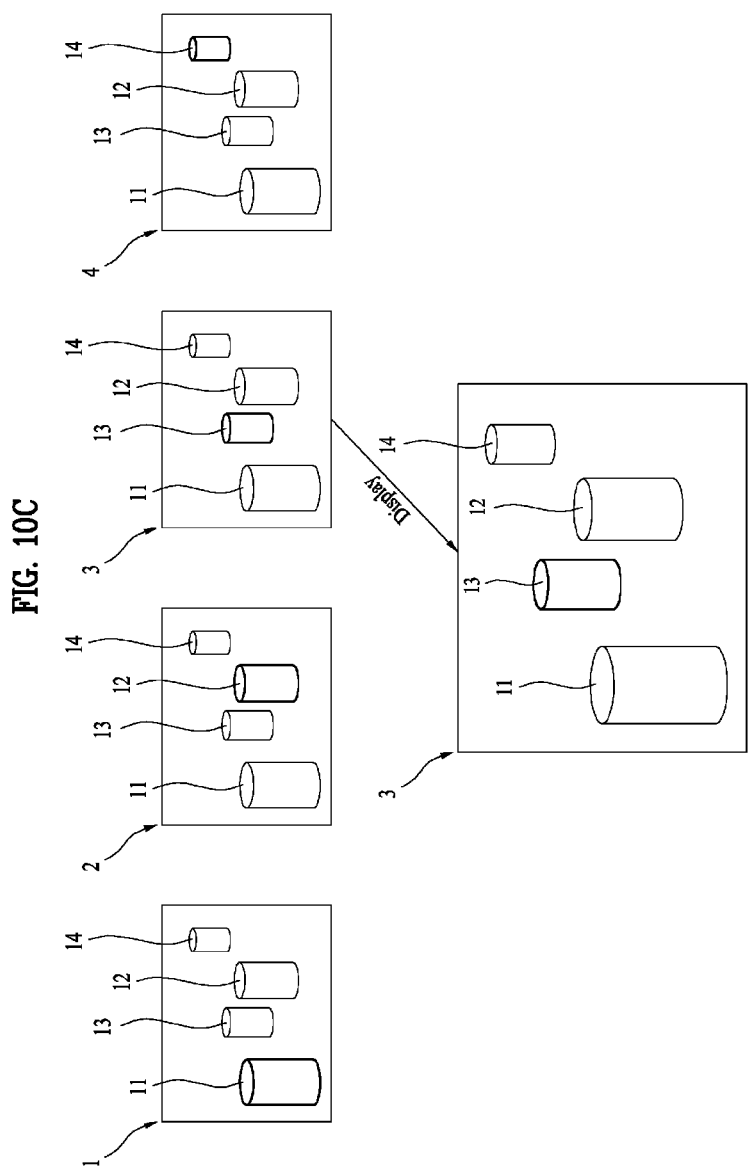

FIG. 14B
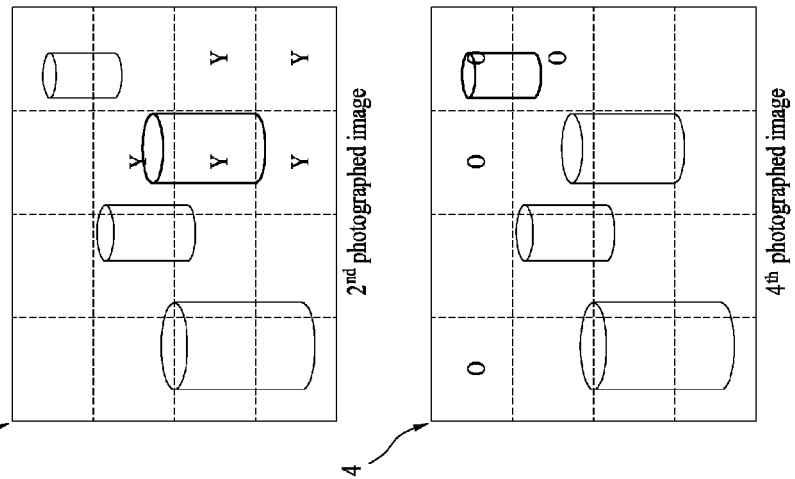
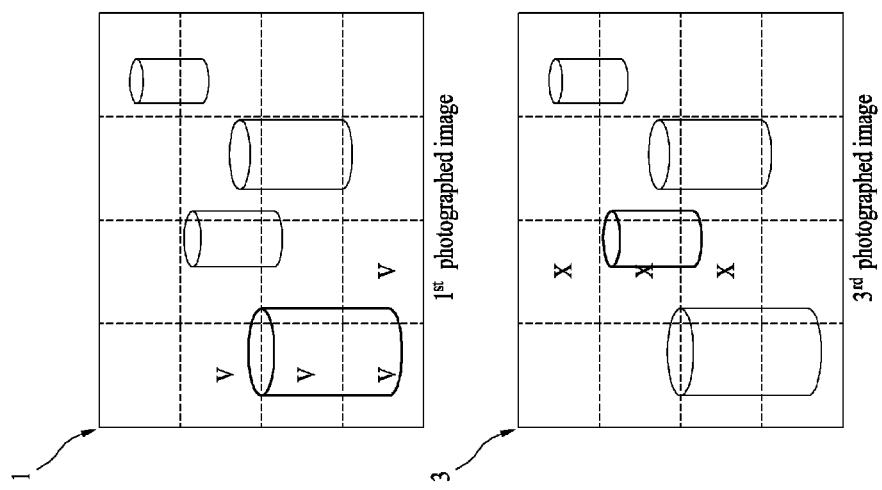

MOBILE TERMINAL AND CONTROLLING METHOD THEREOF

Pursuant to 35 U.S.C. §119(a), this application claims the benefit of earlier filing date and right of priority to Korean Application No. 10-2012-0089729, filed on Aug. 16, 2012, the contents of which are hereby incorporated by reference herein in their entirety.

BACKGROUND OF THE INVENTION

Field of the Invention

The present invention relates to a mobile terminal for adjusting a focus after taking an image via a camera provided to the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals. In addition, the mobile terminals can be further classified into handheld terminals and vehicle mount terminals.

As functions of a terminal are becoming diversified, the needs for creation and management of multimedia contents using the terminal are gradually increasing. To meet the needs, a function of camera tends to become important in the terminal.

When a photo is taken via a camera, a process for focusing the camera on a desired subject is performed. If a photographing proceeds when a desired subject is not in focus, it causes a problem that a blurred photo of the desired subject is captured. Although a user takes a photo of a desired subject after focusing on the desired subject, it is inconvenient for the user to check whether a camera is correctly focused on the subject by checking a result of the photo-taking one by one.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which user's manipulation convenience is improved.

In particular, the object of the present invention is to provide a mobile terminal and controlling method thereof, by which a photographed image of a user-selected subject in focus can be displayed after taking a photo.

Another object of the present invention is to provide a mobile terminal and controlling method thereof, by which a 3D image can be created based on a taken photo.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a camera configured to photograph a plurality of images, a touchscreen configured to display one of the plurality of the photographed images or a first synthetic image created from synthesizing at least two of the plurality of the photographed images together as a representative image, and a controller, if a first touch input is applied while the representative image is displayed, configured to extract an image having a best resolution for an object or region selected by the first touch input from a plurality of the photographed images, and control the extracted image to be output via the touchscreen.

In another aspect of the present invention, a method of controlling a mobile terminal according to one embodiment of the present invention may include the steps of photographing a plurality of images, displaying either one of the plurality of the photographed images or a first synthetic image created from synthesizing at least two of the plurality of the photographed images together as a representative image, if a first touch input is applied while the representative image is displayed, extracting an image having a best resolution for an object or region selected by the first touch input from a plurality of the photographed images, and displaying the extracted image.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 7 is a diagram illustrating one example to describe photographed images created in a multi-focus photographing mode;

FIGS. 10A to 10C are diagrams illustrating one example to describe a process for displaying a photographed image having a best resolution in a user-set ROI (region of interest);

FIGS. 14A to 14C are diagrams illustrating one example to describe a process for creating an all-focus image having best resolution in all regions;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

Figure 1:
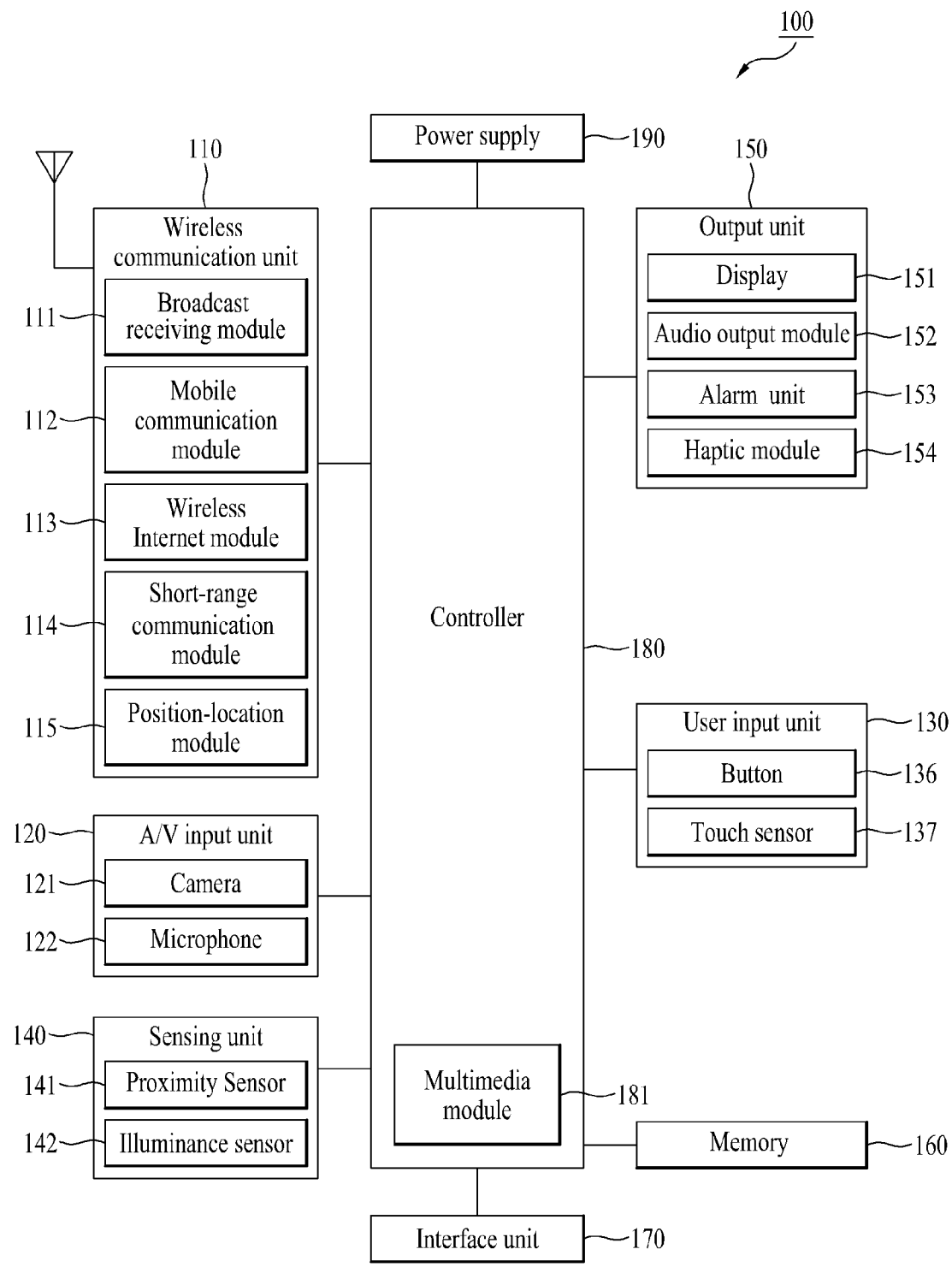
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141 and an illumination sensor 142.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
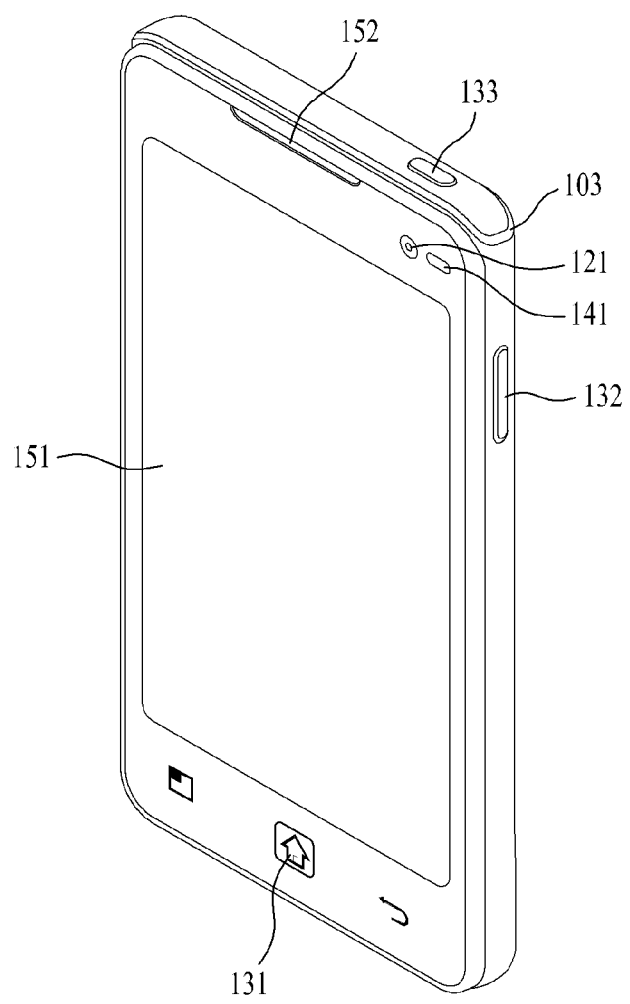
FIG. 2 is a front perspective diagram of a mobile terminal according to one embodiment of the present invention.

Referring to FIG. 2, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action will be named 'proximity touch'. If a pointer actually comes into contact with a touchscreen, such an action will be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example. A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. Further, a command for a volume adjustment of sound output from the audio output unit 152 and the like can be input to the second manipulating unit 132, a command for a switching to a touch recognizing mode of the display 151 and the like can be input to the second manipulating unit 133.

Figure 3:
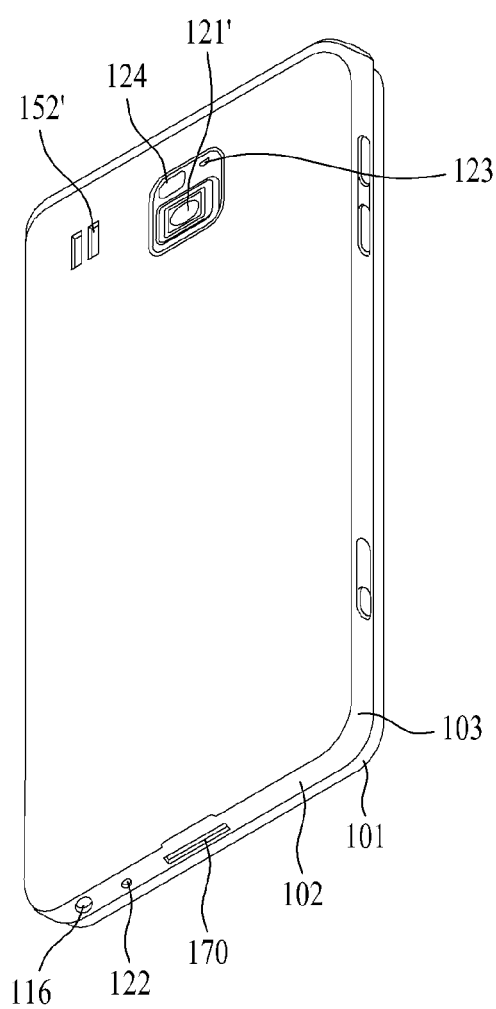
FIG. 3 is a rear perspective diagram of a mobile terminal according to one embodiment of the present invention.

Next, FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
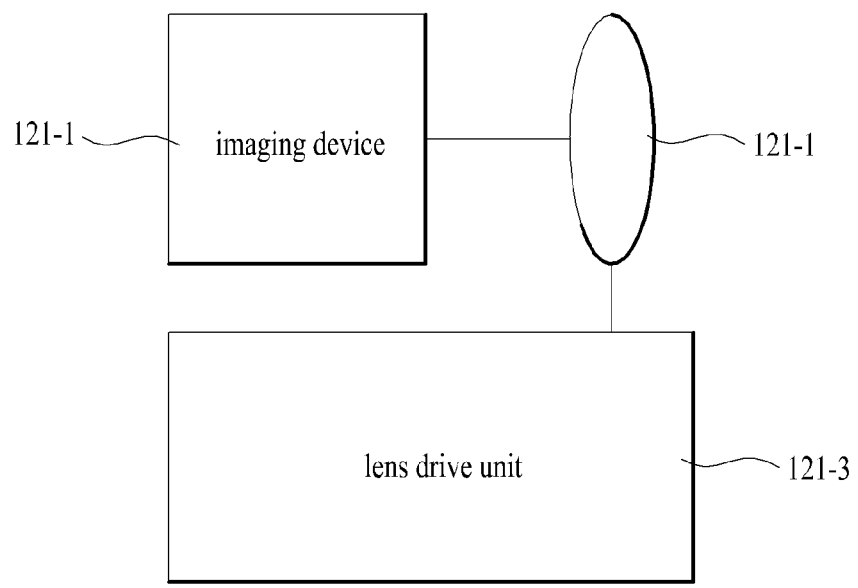
FIG. 4 is a block diagram illustrating a detailed configuration of a camera shown in FIG. 1.

FIG. 4 is a block diagram for a detailed configuration of a camera shown in FIG. 1. Referring to FIG. 4, the camera 121 of the mobile terminal 100 may include a lens 121-1, an image device 121-2 and a lens drive unit 121-3.

The lens 121-1 receives an input of a subject image incident from an outside of the mobile terminal 100, refracting the subject image, and then forwards the refracted subject image to the imaging device 121-2. In the drawing, the lens 121-1 is illustrated as a single convex lens, which is just provided for clarity. In addition, a plurality of lenses is available for the camera.

The lens drive unit 121-3 shifts the lens 121-1 in all directions (e.g., back, forth, right, left, etc.) to change a focal distance of an image input to the imaging device 121-2. Generally, when the mobile terminal 100 has an auto-focusing function installed thereon, the lens drive unit 121-3 can automatically shift the lens 121-1 to set a selected object to be in focus. Of course, a user can manually focus the camera 121 on a selected object by randomly adjusting the lens drive unit 121-2.

In particular, the lens drive unit 121-3 of the present invention diversifies a focal distance of an image input to the imaging device 121-2 by repeatedly shifting the lens in the direction of an optical axis. In doing so, the lens drive unit 121-3 can operate to equalize a physical moving distance of the lens 121-1 or can shift the lens 121-1 to increase or decrease a focal distance of the lens 121-1 uniformly. In order to adjust a position of the lens 121-1, the lens drive unit 121-3 of the present invention can include at least one of a stepping motor, a piezoelectric device, a VCM (voice-coil motor) and a VCA (voice-coil actuator).

The imaging device 121-2 is the device that converts an analog image input via the lens 121-2 to a digital image. A capacity of the imaging device 121-2 varies depending on at least one of a definition, a resolution, a digital image type and the like. In addition, the image device 121-2 is being developed to create a digital image of high resolution.

In the early days, the imaging device 121-2 works by only converting an image, which is created at the moment of inputting a photographing command, to a digital image and then saving the digital image. Recently, since a photographing is performed by looking at the display unit 151 instead of a finder, it is necessary to continuously convert input images to digital images. In order to enable a video to look smooth, at least 12 digital images per second are necessary. In some instances, digital images more than 12 can be created and provided to the display unit 151.

For clarity and convenience of the following description, assume that a mobile terminal 100 mentioned in the following description includes at least one of the components shown in FIG. 1. In particular, the mobile terminal 100 according to an embodiment of the present invention may include the camera 121, the memory 160, the display unit 151 and the controller 180 among the components shown in FIG. 1. If the display module 151 includes a touchscreen, implementation of the following embodiments may be further facilitated. Therefore, the following description is made on the assumption that the display module 151 includes a touchscreen.

Figure 5:
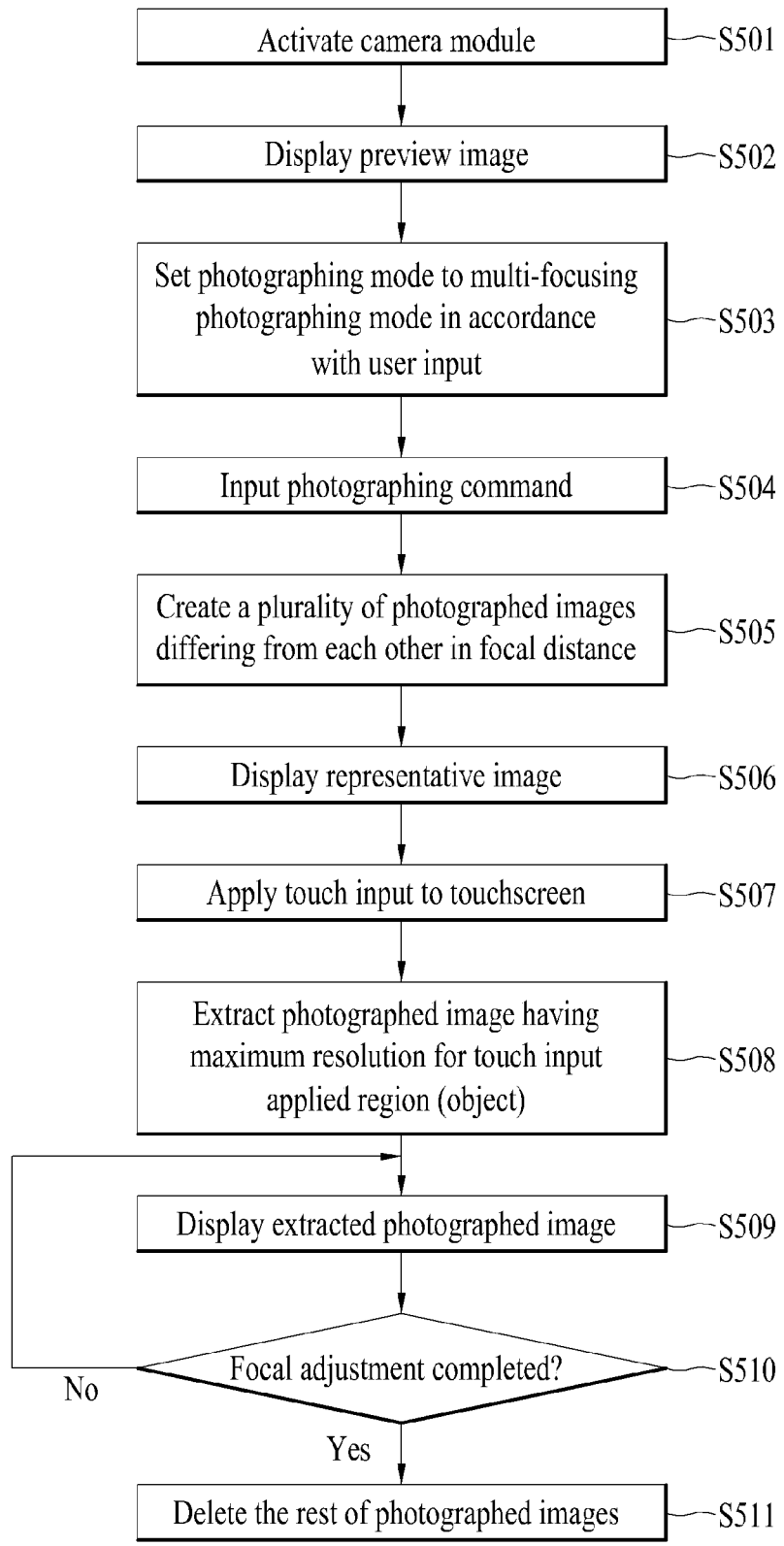
FIG. 5 is a flowchart illustrating an operation of a mobile terminal according to one embodiment of the present invention.

Next, FIG. 5 is a flowchart illustrating an operation of a mobile terminal according to one embodiment of the present invention. Referring to FIG. 5, if the camera module 121 is activated by an appropriate manipulation of a user (S501). The controller 180 can control the touchscreen 151 to display a preview image input by real time via the camera 121 (S502). When the preview image is displayed, the controller 180 can also control a setting menu for adjusting a photographing mode of the camera 121 to be displayed on the touchscreen 151.

Thereafter, after a photographing mode of the camera 121 has been set to a multi-focusing photographing mode (S503), and if a photographing starts (S504), the controller 180 can create a plurality of photographed images differing from each other in focal distance (S505). The multi-focusing mode described with reference to FIG. 5 will be described in further detail with reference to FIGS. 6 to 8 as follows.

Figure 6A:
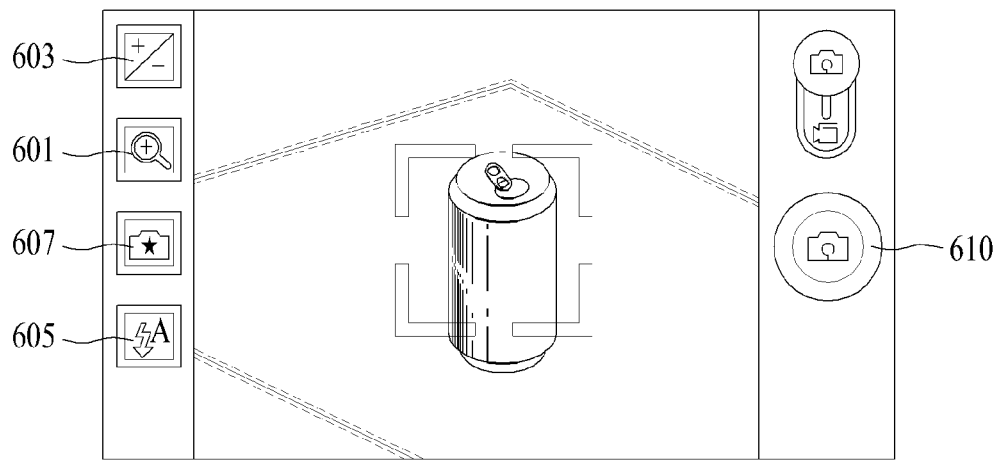
FIG. 6A and FIG. 6B are diagrams illustrating one example of setting a photographing mode of a camera to a multi-focus photographing mode using a setting menu displayed together with a preview image.
Figure 6B:
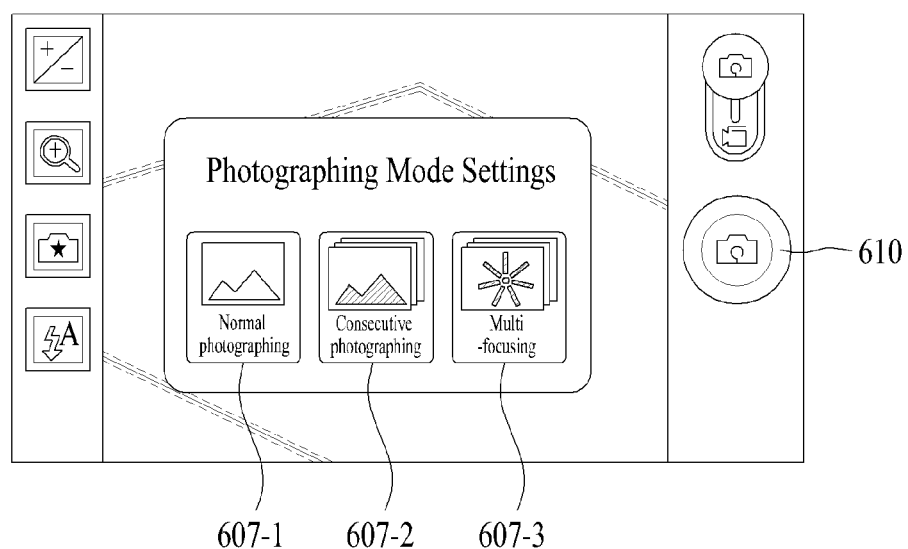

In particular, FIG. 6A and FIG. 6B are diagrams illustrating one example of setting a photographing mode of a camera to a multi-focus photographing mode using a setting menu displayed together with a preview image.

Referring to FIG. 6A, the controller 180 can control the touchscreen 151 to display a setting menu for adjusting the settings of the camera 121 as well as a preview image input via the camera 121. In the example shown in FIG. 6A, the setting menu displays items of a zoom setting 601, a brightness setting 603, a flash activate/deactivate setting 605 and a photographing mode setting 607.

Using the photographing mode setting item 607, a user can adjust a photographing mode of the camera 121 into one of a normal photographing mode 607-1, a consecutive photographing mode 607-2 and a multi-focusing photographing mode 607-3 (FIG. 6B). In the normal photographing mode 607-1, if a photographing command is applied in a manner that the user presses a photographing button 610, an image at the moment of applying the photographing command is converted to a digital image to create a photographed image.

In the consecutive photographing mode 607-2, a consecutive photographing command is controlled to be input while the photographing button 610 is being pressed, whereby a plurality of consecutive photographed images can be created. Since the normal photographing mode 607-1 and the consecutive photographing mode 607-2 are well-known techniques, their details will be omitted from the following description.

The mobile terminal 100 according to an embodiment of the present invention can further provide a selection of the multi-focusing photographing mode 607-3 as a photographing mode of the camera 121. In the multi-focusing photographing mode 607-3, after a plurality of photographed images differing from each other in focal distance have been created, if a corresponding photographing is completed, a post-focusing correction function can be provided. In particular, the multi-focusing photographing mode 607-3 can be understood as creating consecutive photographed images are created in a manner that varying a focal distance of the lens 121-1 for prescribed duration, whereas the consecutive photographing mode 607-2 is to create consecutively photographed images by maintaining a uniform focal distance of the lens 121-1.

Since the consecutive photographing mode 607-2 creates the photographed images by maintaining a uniform focal distance of the lens 121-1, each of the consecutively photographed images has a focus on the same subject. However, since the multi-focusing photographing mode 607-3 creates the photographed images by varying the focal distance of the lens 121-1, the photographed images may have subjects differing from each other in focus. This will be described in detail with reference to FIG. 7 as follows.

FIG. 7 is a diagram illustrating one example to describe photographed images created in a multi-focus photographing mode. For clarity of the following description, assume that total 4 photographed images are created in a multi-focusing photographing mode. For further clarity, the 4 photographed images will be named first to photographed images 1 to 4 in left-to right order, respectively.

Referring to FIG. 7, after a photographing mode of the camera 121 has been set to the multi-focusing photographing mode, if a photographing command is input, the controller 180 can photograph a plurality of photographed images by varying positions (particularly, a focal distance of the lens 121-1) of the lens 121-1. In particular, if a user's photographing command is input, the controller 180 can control a plurality of photographed images to be created by moving the lens 121-1 in a direction of an optical axis (e.g., in a direction in which a focal distance of the lens 121-1 increases gradually).

In the example shown in FIG. 7, when a plurality of the photographed images are photographed, since positions (i.e., focal distances) of the lens 121-1 are different from each other, a focused image in each of the photographed images may not be maintained uniform. In particular, since the lens 121-1 is focused on a subject in a nearer distance in response to a shorter focal distance of the lens 121-1 or the lens 121-1 is focused on a subject in a farther distance in response to a longer focal distance of the lens 121-1, an image photographed in a longer focal distance of the lens 121-1 may have a farther-distance focused subject rather than a nearer-distance focused subject in an image photographed in a shorter focal distance of the lens 121-1.

For the example shown in FIG. 7, in a first photographed image 1 photographed in a focal distance d1 of the lens 121-1, a first object 11 is brought into focus while second to fourth objects 12 to 14 are out of focus. On the contrary, in a second photographed image 2 photographed in a focal distance d2 of the lens 121-1, a second object 12 is brought into focus while first, third and fourth objects 11, 13 and 14 are out of focus. In a third photographed image 3, the third object 13 is brought into focus. In a fourth photographed image 4, the fourth object 14 is brought into focus. For clarity, in FIG. 7, 4 objects captured in the photographed image are named first to fourth objects 11 to 14, respectively, in response to a spaced distance from the camera 121.

As mentioned in the description of the above example, various photographed images can be taken by varying a focal distance of the lens 121-1 in the multi-focusing photographing mode. Since a focal distance of the lens 121-1 in each of the photographed images is different and a focused part in each of the photographed images is not uniform, a point having a maximum resolution may be set different for each of the photographed images. For instance, regarding the resolution around the first object 11, the first photographed image 1 has a maximum resolution. However, regarding the resolution around the second object 12, the second photographed image 2 has a maximum resolution instead of the first photographed image 1.

In the description of a following example, the multi-focusing photographing mode may be understood as provided to extract a photographed image having a best resolution from ROI (region of interest) after creating a plurality of photographed images differing from each other in focal distance.

In creating a plurality of the photographed images by moving the lens 121-1 in the direction of the optical axis, the controller 180 can control a photographed image to be taken each time the lens 121-1 arrives at a preset lens position. A plurality of preset lens positions may be set between an initial position of the lens 121-1 and an end position of the lens 121-1. Each time the lens 121-1 passes through the preset lens position, the controller 180 can control a photographed image of a subject to be created. In doing so, spaces between a plurality of the preset lenses positions may be set equal to each other, which is not mandatory.

Based on a current value applied to the lens drive unit to move the lens 121-1 in the direction of the optical axis, the controller 180 can determine whether the lens 121-1 arrives at the preset lens position. If the lens 121-1 arrives at the preset lens position, the controller 180 can control a photographed image to be created based on an image incident on the imaging device.

In the above-described example, the photographed image is created each time the lens 121-1 passes through the preset lens position. However, the controller 180 may control a photographed image to be created in a prescribed time interval. For instance, if a time taken for the lens 121-1 to move to an end position from an initial position is t, the controller 180 creates a photographed image each time a time of t/N expires after receiving an input of a photographing command, thereby controlling N photographed images to be created. When an initial photographed image is created as soon as a photographing command is input, (N+1) photographed images may be created.

The created photographed image may be divided into a header region and a data region. In particular, the data region may be understood as a port for recording image data therein, while the header region may be understood as a part for recording EXIF data of photographing information therein. When the EXIF (exchangeable image file format) data is recorded in the header region, the controller 180 can obtain information of a photographed image without decoding the data region.

In creating a photographed image, the controller 180 of the present invention can control EXIF data to be correspondingly saved in the header region of the photographed image. In this instance, the photographing information included in the EXIF data includes such basic information as a camera manufacturer, a camera model, a photographing hour and the like and may further include at least one of a photographed sequence number of a photographed image, a focal distance at the moment of a photographing, a spaced distance from a focused subject, a resolution information of a photographed image and the like.

In this instance, the photographed sequence number of the photographed image may be provided to indicate a photographed sequence of each of a plurality of photographed images created as a result of a once-applied photographing command in a multi-focus photographing mode. In the example shown in FIG. 7, when 4 photographed images are created by varying a focal distance of the lens 121-1 in the multi-focus photographing mode, sequence numbers 1 to 4 may be assigned to the photographed images in order, respectively.

The focal distance means a focal distance of the lens 121-1 when a photographed image is created. If the focal distance is included in the EXIF data, a user can check a focal distance at the moment of creating the corresponding photographed image. The spaced distance from a subject in focus may mean an actual spaced distance between the mobile terminal 100 and an object located at a point having a maximum resolution in a photographed image. In this instance, the spaced distance from the subject may mean a vertical distance between the mobile terminal 100 (or an extension line deriving from the mobile terminal 100) and the subject.

For instance, in the example shown in FIG. 7, if the first to fourth objects 11 to 14 are spaced apart from the mobile terminal 100 by 1 m, 2 m, 3 m and 4 m, respectively, a spaced distance from a subject in focus may be recorded as 1 m in the first photographed image 1, a spaced distance from a subject in focus may be recorded as 2 m in the second photographed image 2, a spaced distance from a subject in focus may be recorded as 3 m in the third photographed image 3, and a spaced distance from a subject in focus may be recorded as 4 m in the fourth photographed image 4.

The resolution information of the photographed image may include at least one of a resolution value for a prescribed object captured in the photographed image and a resolution value across a whole region of the photographed image. A process for recording the resolution information of the photographed image will be described in detail with reference to FIG. 8 and FIG. 9 as follows. For clarity, assume that a plurality of photographed images include the 4 photographed images 1 to 4 described with reference to FIG. 7.

Figure 8:
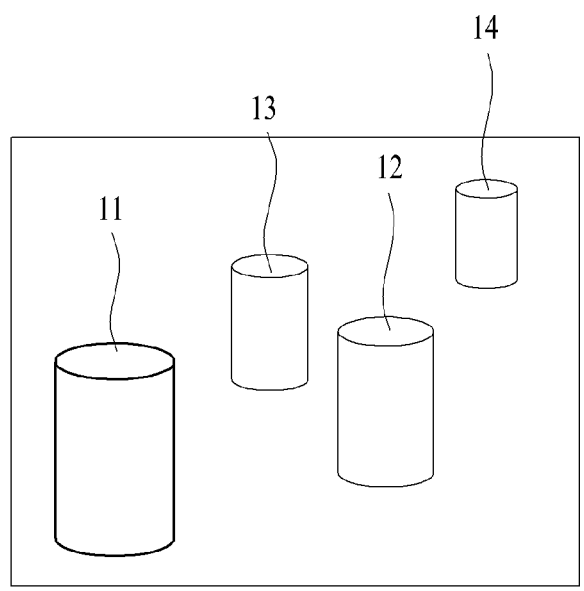
FIG. 8 is a diagram illustrating one example to describe a process for recording a resolution value for a prescribed object, which is captured in a photographed image, in EXIF data.

FIG. 8 is a diagram illustrating one example to describe a process for recording a resolution value for a prescribed object, which is captured in a photographed image, in EXIF data. For example, 4 objects 11 to 14 are captured in the photographed image shown in FIG. 8. The controller 180 detects an object (e.g., a body, a character, etc.) included in the photographed image and can then record a resolution value of the detected object in EXIF data. In particular, the controller 180 can control resolution information on the first to fourth objects 11 to 14 to be recorded in EXIF data of the first to fourth photographed images 1 to 4, respectively.

Hence, the controller 180 can extract a photographed image having a maximum resolution value per object by inquiring the EXIF data of a header region without decoding a data region of the photographed image.

Recording a resolution value for a prescribed object captured in a photographed image may not necessarily mean that resolution values for all photographed objects should be recorded. For instance, the resolution values of the first to fourth objects 11 to 14 in the first photographed image 1 shown in FIG. 7 may not be included in the EXIF data. When the first photographed image 1, since the first object 11 located in a near distance is in focus, a recognition rate for the fourth object 14 located in a far distance may decrease considerably. In this instance, the controller 180 can control a resolution value, which corresponds to an object detectable through the first photographed image 1, to be recorded only. For instance, if the first to third objects 11 to 13 are detectable only through the first photographed image 1 except the fourth object 14, the resolution values for the first to third objects 11 to 13 are recorded but the recording of the resolution value for the fourth object 14 can be omitted.

Figure 9:
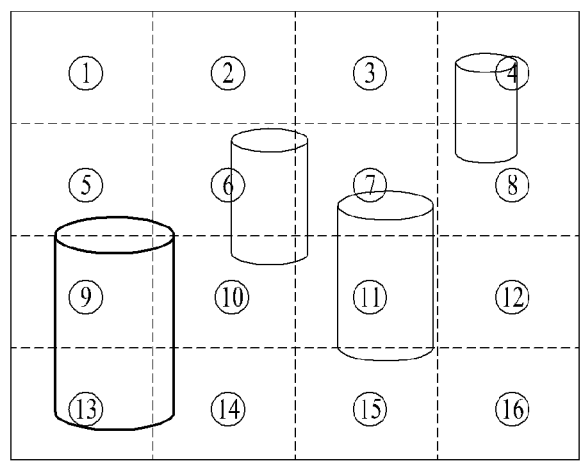
FIG. 9 is a diagram illustrating one example to describe a process for recording resolution values across a whole region of a photographed image in EXIF (exchangeable image file) data.

Next, FIG. 9 is a diagram illustrating one example to describe a process for recording resolution values across a whole region of a photographed image in EXIF (exchangeable image file) data.

Referring to FIG. 9, in order to record resolution values across a whole region of a photographed image in EXIF data, the controller 180 partitions the photographed image into M regions and then controls a resolution value of each of the regions to be recorded in EXIF data. Since the photographed image shown in FIG. 9 is partitioned into 16 regions (named first to $16^{th}$ regions in order from a left top corner to a right bottom corner, respectively), the controller 18 can record the resolution values for the first to $16^{th}$ regions, respectively.

Hence, the controller 180 can extract a photographed image having a maximum resolution value in a desired region by inquiring the EXIF data recorded in a header region without decoding a data region of the photographed image. FIG. 9 shows the example of partitioning the photographed image into the 16 regions for clarity, by which the present invention may be non-limited.

In the example shown in FIG. 8 or FIG. 9, the resolution values of the objects captured in the photographed image or the resolution values in the regions generated from partitioning the photographed image into M regions can be recorded in EXIF data by the controller 180. However, the resolution value recorded in the EXIF data may not include an absolute amount of the resolution. For instance, for the rest of the photographed images except an initially photographed image, a resolution difference from the initial photographed image or a resolution difference value from a previous photographed image can be recorded in the EXIF data by the controller 180.

For instance, in the example shown in FIG. 8, when a resolution absolute amount for the first object 11 in the first photographed image 1 and a resolution absolute amount for the first object 11 in the second photographed image 2 are measured as 10 and 8, respectively, a resolution difference '−2' can be recorded as the resolution value for the first object 11 in the EXIF data of the second photographed image 2 instead of the absolute amount '8'.

By recording the resolution difference in the EXIF data instead of the absolute amount of resolution, it is advantageous in determining 'high' or 'low' of the resolution using a sign of the resolution difference without a separate operation. In particular, if the sign of the resolution difference is '+', a corresponding photographed image can be understood as having a resolution higher than that of a previous photographed image for a corresponding object (or region). On the contrary, if the sign of the resolution difference is '−', a corresponding photographed image can be understood as having a resolution lower than that of a previous photographed image for a corresponding object (or region).

In this instance, a photographed image of a previous sequence number may not always mean a photographed image of a sequence number right next to the previous sequence number. It is enough for the previous sequence number to be ahead of a sequence number of a photographed image to compare to. Moreover, the previous sequence number may be fixed to a photographed image of an initial sequence number (i.e., an initially photographed image). For instance, in recording the EXIF data of the third photographed image 3, a resolution difference from the second photographed image 2 may be recorded. Alternatively, a resolution difference from the first photographed image 1 may be recorded.

Referring now to FIG. 5 for the description of the present invention, the controller 180 selects at least one of a plurality of the photographed images as a representative image and can then display the selected representative image (S506). Subsequently, if the user applies a touch input to a prescribed region of the representative image or a prescribed object displayed on the representative image (S507), the controller 180 extracts a photographed image having a best resolution for the touch-applied prescribed region or the touch-applied prescribed object from a plurality of the photographed images and can then control the extracted photographed image to be displayed on the touchscreen 151 by replacing the representative image (S508). Thus, the controller 180 can control a photographed image, which is focused on a user's touch input applied point, to be displayed on the touchscreen 151 among a plurality of the photographed images. Hence, even if a photographing is performed without being focused on a specific subject, a photographed image brought into focus on the specific subject can be displayed after the photographing.

A process for displaying a photographed image having a best resolution in a user-set ROI (region of interest) will be described in detail with reference to FIGS. 10A to 10C as follows. For clarity, assume that a plurality of photographed images include the 4 photographed images 1 to 4 described with reference to FIG. 7. In addition, assume that ROI (region of interest) set by a user is configured by a unit of an object displayed in a photographed image like the example shown in FIG. 8.

Next, FIGS. 10A to 10C are diagrams illustrating one example to describe a process for displaying a photographed image having a best resolution in a user-set ROI (region of interest). Referring to FIG. 10A, if a plurality of photographed images are created, the controller 180 selects a prescribed photographed image as a representative image from a plurality of the photographed images and can then display the selected photographed image on the touchscreen 151.

Although FIG. 10A shows one example that the first photographed image focused on a first object 11 is selected as the representative image, it is not mandatory for an initially created photographed image to be selected as the representative image. For instance, a photographed image of a sequence number next to that of an initial photographed image may be set as the representative image. In some instances, a multi-focus image generated from synthesizing at least two images together may be displayed as the representative image. The multi-focus image will be described in detail in the description of 'All Focus' item later.

While the representative image is being displayed, if a user applies a touch input to the touchscreen 151, the controller 180 can extract a photographed image having a maximum resolution value at an object (cf. FIG. 8B) corresponding to the user's touch input. In FIG. 10A, since the touch input 1001 is applied to a second object 12, the controller 180 extracts the second photographed image 2 having a highest resolution value for the second object 12 and can then control the second photographed image 2 to be displayed on the touchscreen 151 (FIG. 10B). While the second photographed image 2 is being displayed, if a touch input 1003 is applied to a third object 13, the controller 180 extracts the third photographed image 3 having a highest resolution value for the third object 13 and can then control the third photographed image 3 to be displayed on the touchscreen 151 (FIG. 10C). In extracting the photographed image having the highest resolution value, the controller 180 may use EXIF data of each of a plurality of the photographed images. Since a data region decoding process can be omitted when using the EXIF data, a photographed image having a best resolution value at a touched point can be extracted in a short period of time.

However, if resolution information is not included in the EXIF data, a photographed image having a best resolution value at a touch input applied point may be extracted by decoding a data region of each of the photographed images.

Like the example shown in FIG. 10, a user can adjust a focus by applying a touch input to a point, into which a user intends to bring a focus, not at the time of the photographing but after completion of the corresponding photographing. Hence, the user can adjust a focus despite performing the photographing without adjusting a focus, thereby preventing an undesired subject from being in focus or preventing a desired subject from being output of focus.

In the example shown in FIG. 10, since a user's touch input applied point is set as an ROI (region of interest), a photographed image having a best resolution is the ROI is extracted. However, it is not mandatory for a user-touched point to be set as an ROI. According to another embodiment of the present invention, the controller 180 can set an ROI in accordance with a property of an object captured in a photographed image. This will be described in detail with reference to FIGS. 11A to 11C as follows.

Figure 11A:
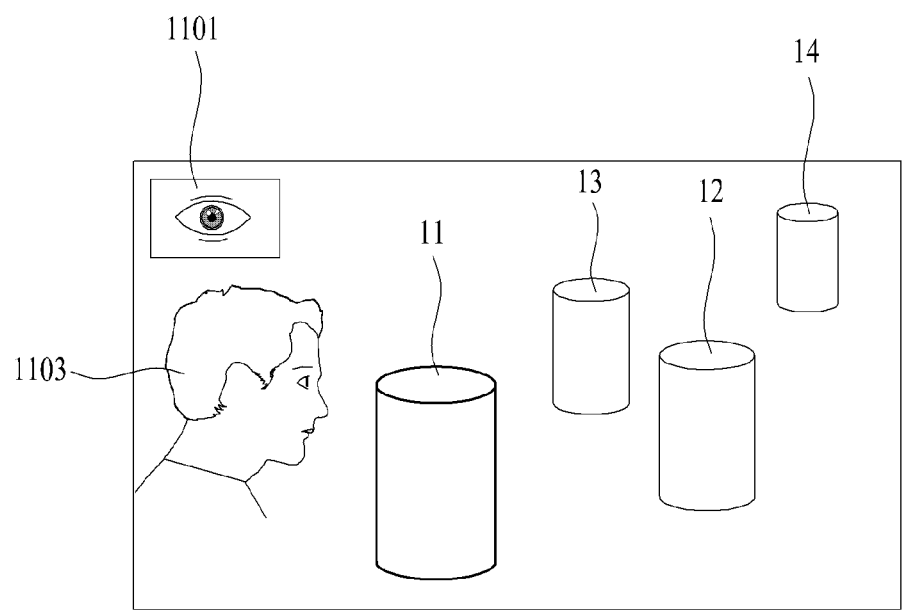
FIGS. 11A to 11C are diagrams illustrating one example to describe a process for setting an object, at which a character in a photographed image is gazing, to be in focus on by applying an eye tracking algorithm.
Figure 11B:
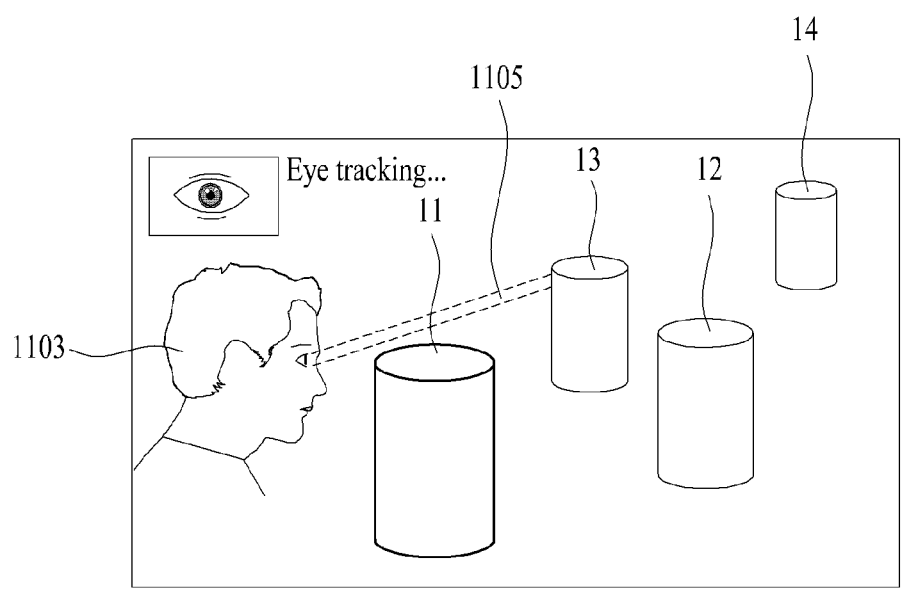
Figure 11C:
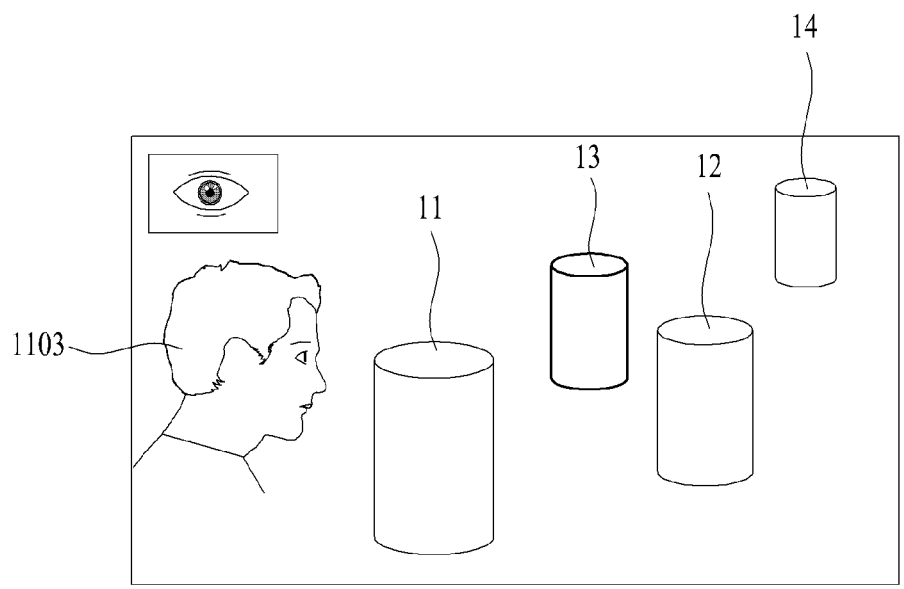

FIGS. 11A to 11C are diagrams illustrating one example to describe a process for setting an object, at which a character in a photographed image is gazing, to be in focus on by applying an eye tracking algorithm. For clarity, assume that a plurality of photographed images include the 4 photographed images 1 to 4 described with reference to FIG. 7. In addition, assume that an eye of a character (or animal) 1103 is further displayed on each of the 4 photographed images 1 to 4.

Referring to FIG. 11A, if a user selects an eye tracking button 1001, the controller 180 can determine an object or region, on which the eyes of the character 1103 captured in a photographed image, using an eye tracking algorithm. In doing so, referring to FIG. 11B, the controller 180 can control a gaze path 1105 of the captured character 1103 to be displayed. If the captured character gazing region is determined, the controller 180 extracts a photographed image having a best resolution value from the captured character gazing region and can then display the extracted photographed image. For instance, in the example shown in FIG. 11B, when the character captured in the photographed image is gazing at the third object 13, the controller 180 extracts a photographed image having a best resolution value for the third object 13 and can then display the extracted photographed image on the touchscreen 151 (FIG. 11C).

In the example shown in FIG. 11, the eye tracking algorithm is usable only if the eye of the character (or animal) 1103 is displayed in the photographed image. Hence, only if the eye of the character 1103 is detected from the photographed image, it can control the eye tracking button to be displayed.

When a plurality of characters are captured in the photographed image, it may be able to control a multi-focus image to be output via the display unit 151. In this instance, the multi-focus image may be created from combining regions, at which characters selected from a plurality of the characters by a user input gaze, together. Alternatively, the multi-focus image may be created from combining regions, at which a plurality of the characters gaze, respectively, together. The multi-focus image will be further described with reference to FIG. 12 later.

In the example shown in FIG. 10 or FIG. 11, one ROI (region of interest) is set in accordance with a user's touch input and a region at which a character captured in a photographed image. However, it is not necessary for one ROI to be set only. When a plurality of ROIs, an operation of the mobile terminal 100 is further described in detail with reference to FIG. 12 as follows.

Figure 12A:
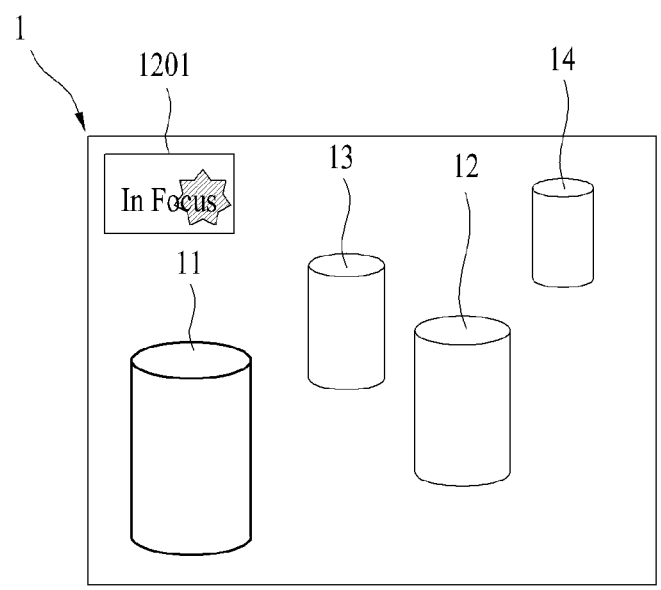
FIGS. 12A to 12C are diagrams illustrating one example to describe a process for creating a multi-focus image having best resolutions in a plurality of interesting regions set in a representative image.
Figure 12B:
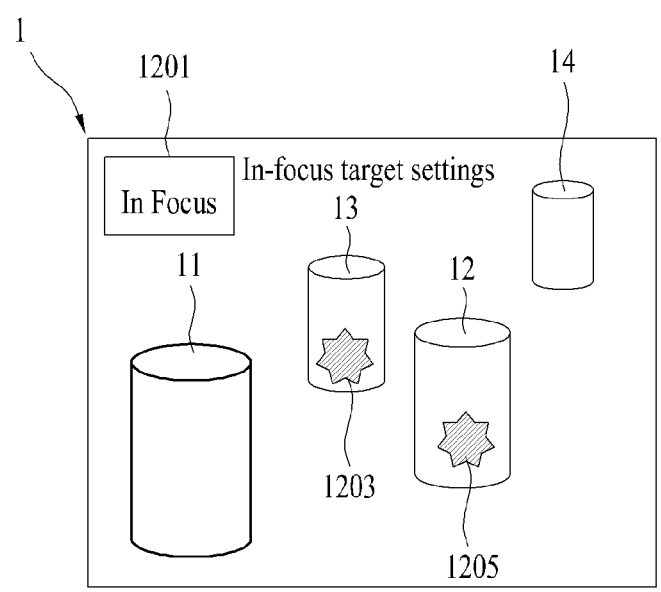
Figure 12C:
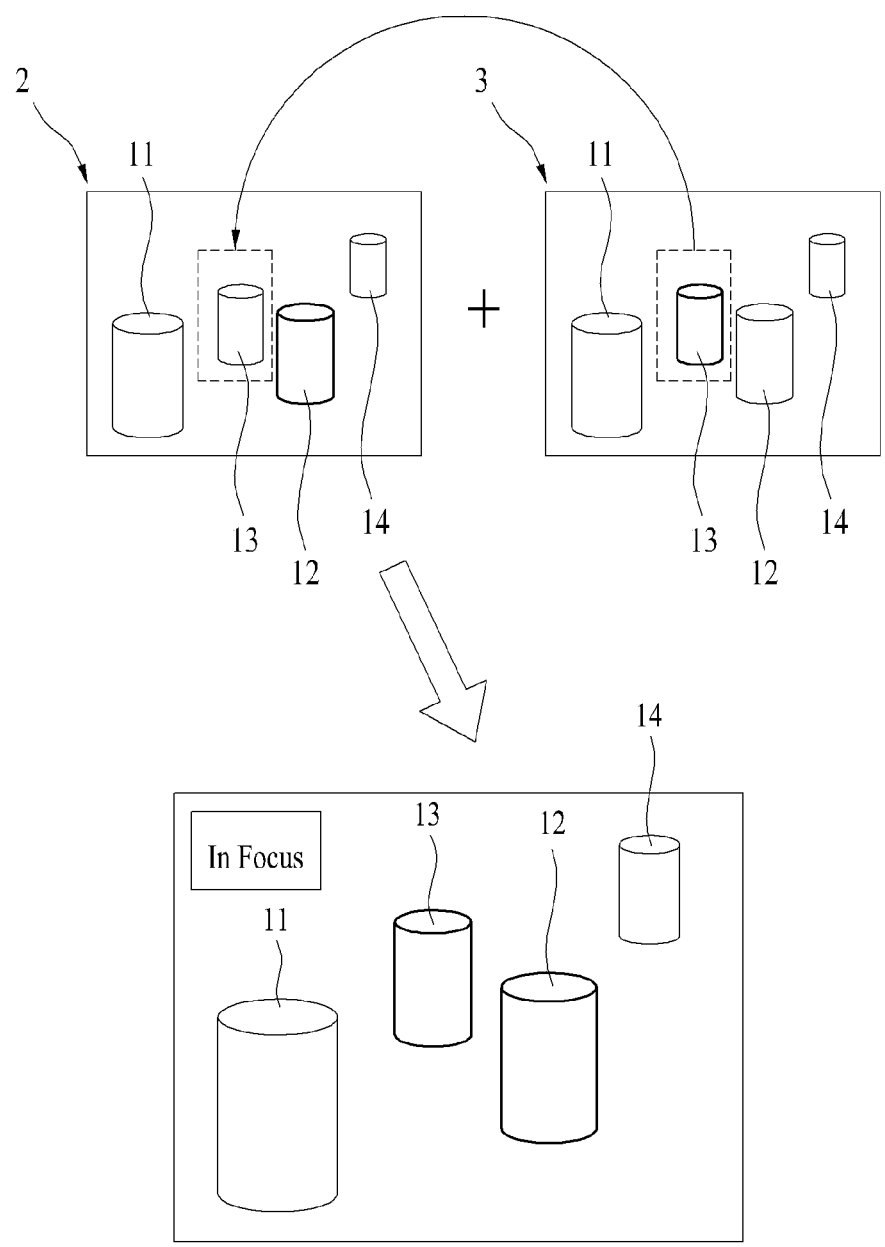

Next, FIGS. 12A to 12C are diagrams illustrating one example to describe a process for creating a multi-focus image having best resolutions in a plurality of interesting regions set in a representative image. For clarity, assume that a plurality of photographed images include the 4 photographed images 1 to 4 described with reference to FIG. 7.

Referring to FIG. 12A, while a representative image is being output via the touchscreen 151, if a user selects an 'In Focus' button 1201, the controller 180 can enter a standby mode for waiting for a user's touch input. Subsequently, if the user selects a region to give an in-focus effect thereto, the controller 180 can control an image, in which all regions selected by the user are brought into focus, to be displayed. If there is one region to which the in-focus effect will be given, as mentioned in the foregoing description with reference to FIG. 10, a photographed image having a best resolution in a selected region may be displayed on the touchscreen 151. On the other hand, referring to FIG. 12B, if the in-focus effect is intended to be given to a plurality of regions (e.g., 2 regions 1203 and 1205 selected in FIG. 12B), the controller 180 combines at least two images together and can control a multi-focus image, in which all the selected regions are in focus, to be displayed.

For instance, referring to FIG. 12B, when a touch input is applied to each of the second object 12 and the third object 13, the controller 180 extracts the second photographed image 2 having the highest resolution value for the second object 12 and the third photographed image 3 having the highest resolution value for the third object 13 and can then control a multi-focus image, which is created by synthesizing the second photographed image 2 and the third photographed image 3 together, to be displayed.

The controller 180 sets one of a plurality of the extracted images as a basic image and can then create a multi-focus image by pasting at least one portion of another extracted image to the basic image. For example, referring to FIG. 12C, the controller 180 sets a basic image to the second photographed image 2 focused on the second object 12 and replaces a region of the second photographed image 2 having the third object 13 displayed therein by a region of the third photographed image 3 having the third object 13 displayed therein, thereby creating a multi-focus image by synthesizing the second photographed image 2 and the third photographed image 3 together.

In the example shown in FIG. 12, a multi-focus image having a best resolution for a prescribed ROI (region of interest) set by a user is created. The mobile terminal 100 according to an embodiment of the present invention may create a multi-focus image focused on all objects displayed in a photographed image without waiting for a user's input. This is described in detail with reference to FIG. 13A and FIG. 13B as follows.

Figure 13A:
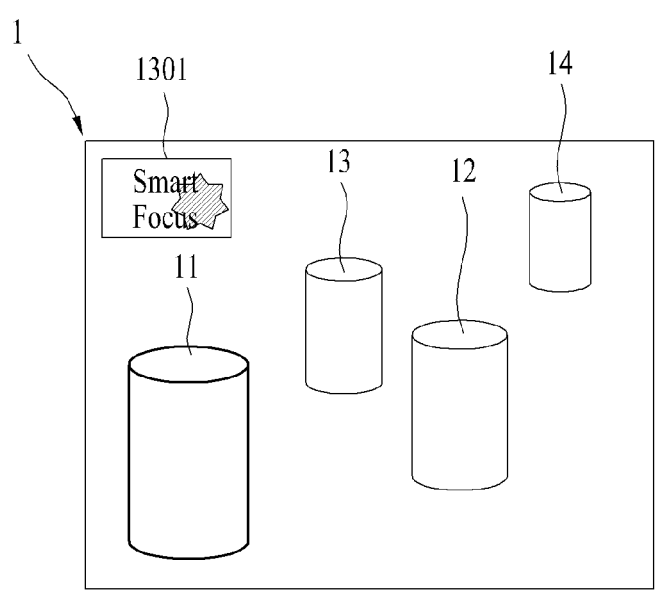
FIG. 13A and FIG. 13B are diagrams illustrating one example to describe a process for creating a multi-focus image of photographed images in focus.
Figure 13B:
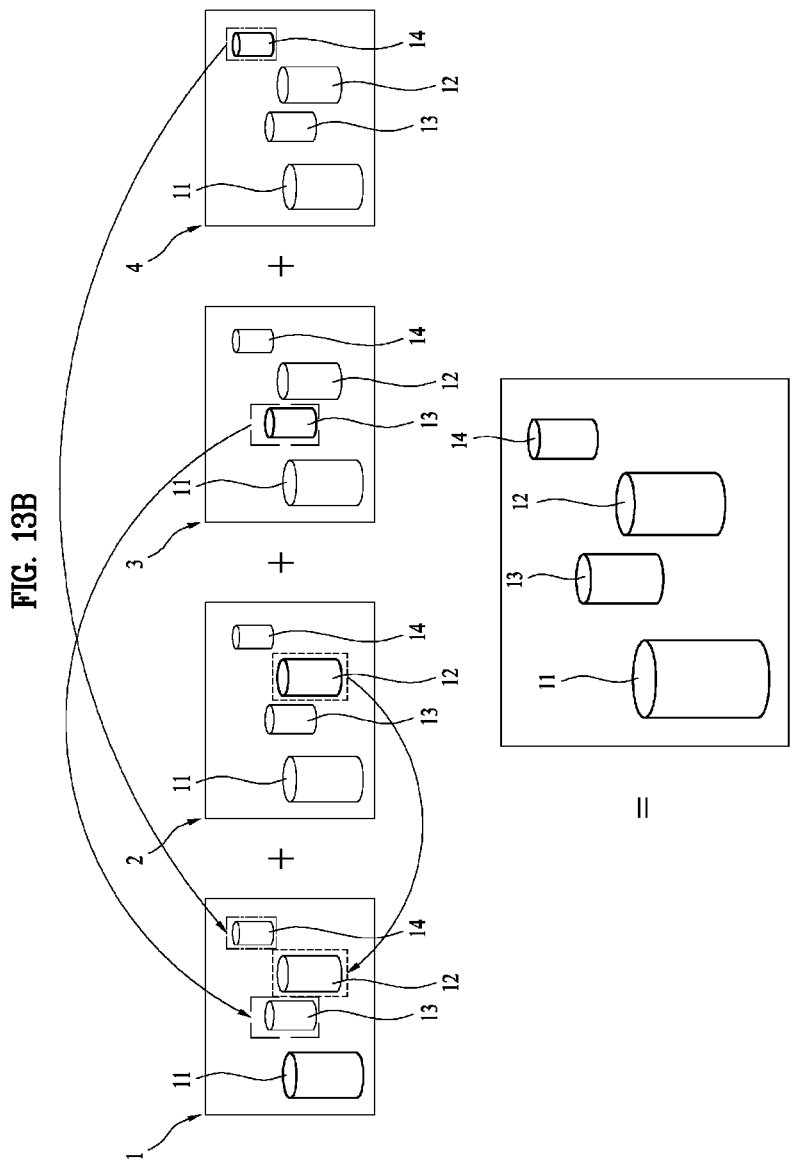

FIG. 13A and FIG. 13B are diagrams illustrating one example to describe a process for creating a multi-focus image of photographed images in focus. For clarity, assume that a plurality of photographed images include the 4 photographed images 1 to 4 described with reference to FIG. 7.

Referring to FIG. 13A, while a representative image is output via the touchscreen 151, if a user selects a 'Smart Focus' button 1301, the controller 180 can control a multi-focus image, which is synthesized by extracting a part having a best resolution value for a photographed object, to be created.

For instance, referring to FIG. 13B, when the 4 photographed images 1 to 4 exist, the controller 180 selects a prescribed one of a plurality of the photographed images as a basic image and can then control a multi-focus image focused on all objects to be created by extracting a part maintaining a best resolution for a photographed object from another image and then pasting the extracted part to the basic image.

For instance, referring to FIG. 13B, when there are 4 photographed objects (i.e., first to fourth objects 11 to 14), the controller 180 can control a multi-focus image, which is focused on all of the 4 objects, to be displayed. In particular, if the first photographed image 1 is selected as the basic image from the first photographed image 1 and the fourth photographed image 4, since the first photographed image 1 has a maximum focus for the first object 11, it is unnecessary to extract an image for the first object 11 from another photographed image.

On the contrary, since the second photographed image 2 has a maximum focus for the second object 12, an image for the second object 12 is extracted from the second photographed image 2 and can be then synthesized with the first photographed image 1. In the same manner, an image for the third object 13 and image for the fourth object 14 are extracted from the third photographed image 3 and the fourth photographed image 4, respectively, and are then synthesized with the first photographed image 1, whereby the photographed image focused on all of the objects can be obtained as shown in FIG. 13B.

For clarity, in the examples shown in FIGS. 10 to 13, an ROI (region of interest) (e.g., a user's touch point, an object displayed point, etc.) is set by an object unit like the example shown in FIG. 8, which is for clarity of the description only. In addition, it is not necessary for the ROI to be set by the object unit as shown in FIG. 8. Alternatively, the ROI can be set by a unit of a partitioned region of a photographed image, as shown in FIG. 9.

For instance, in the example shown in FIG. 10, the controller 180 can control a photographed image, which has a best resolution value in a region corresponding to a user's touch point, to be displayed on the touchscreen 151. In particular, if the user's touch input corresponds to the 9$^{th}$ region among the regions exemplary shown in FIG. 9, the controller 180 can control the first photographed image 1, which has a best resolution value in the 9$^{th}$ region, to be displayed on the touchscreen 151.

In the examples shown in FIGS. 10 to 13, a photographed image (or a multi-focus image) having a best resolution in a prescribed ROI (region of interest) is displayed on the touchscreen 151. The mobile terminal 100 according to an embodiment of the present invention can control an image (hereinafter named an all-focus image), which has best resolution in all regions, to be displayed. This is described in detail with reference to FIGS. 14A to 14C as follows.

Figure 14A:
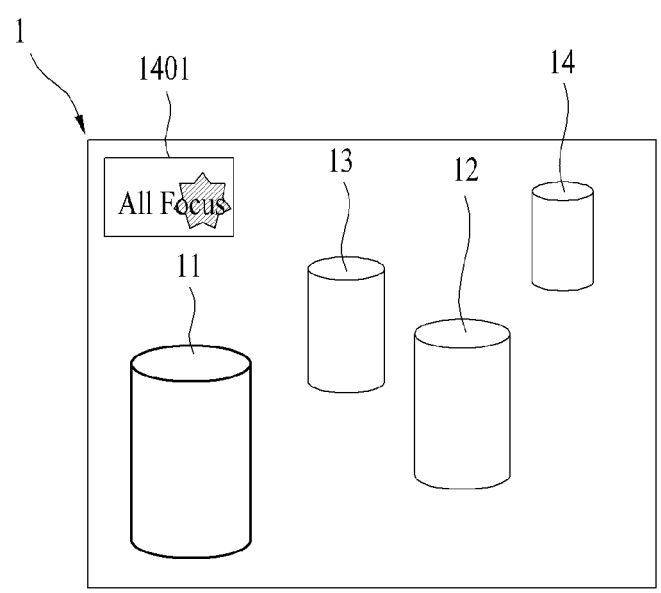
Figure 14C:
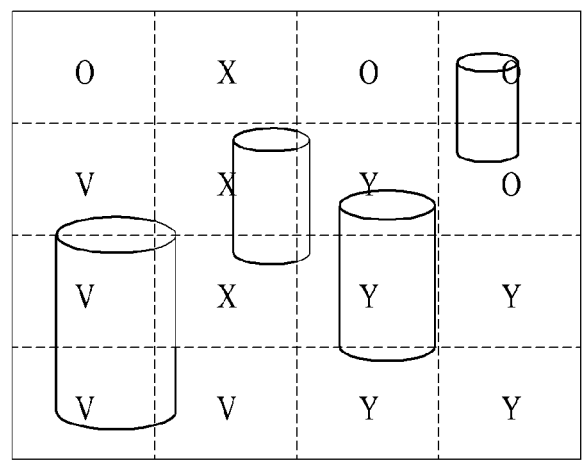

FIGS. 14A to 14C are diagrams illustrating one example to describe a process for creating an all-focus image having best resolution in all regions. For clarity, assume that a plurality of photographed images include the 4 photographed images 1 to 4 described with reference to FIG. 7. Referring to FIG. 14A, while a representative image is output via the touchscreen 151, if a user selects a 'All Focus' button 4301, the controller 180 can control an all-focus image focused on all regions to be displayed.

For instance, referring to FIG. 14B, when each of the photographed images is partitioned into 16 regions, the controller 180 compares a plurality of the photographed images to each other and can then extract the photographed image having a best resolution for each of the first to 16$^{th}$ regions. Subsequently, the controller 180 cuts off the region having the best resolution from each of a plurality of the photographed images and then assembles the cut-off regions together to create an all-focus image.

For instance, in the example shown in FIG. 14B, if the first photographed image 1 has best resolution in the 5$^{th}$, 9$^{th}$, 13$^{th}$ and 1 fourth regions (denoted by V), the second photographed image 2 has best resolution in the 7th, 11$^{th}$, 12$^{th}$, 15$^{th}$ and 16$^{th}$ regions, the third photographed image 3 has best resolution in the second, 6$^{th}$ and 10$^{th}$ regions (denoted by Y), and the fourth photographed image 4 has best resolution in the first, third, fourth and 8$^{th}$ regions (denoted by O), the controller 180 can control an all-focus image, as shown in FIG. 14C, to be created by collecting the regions having the best resolution value from each of a plurality of the photographed images.

In this instance, the numbering for the 16 regions is based on the same reference of FIG. 9. In particular, the 16 regions are named first to 16$^{th}$ regions in order from a left top corner to a right bottom corner, respectively. Unlike the smart-focus function described with reference to FIG. 13, an all-focus image having the best resolution for a background, in which a photographed object is situated, can be obtained as well as for the photographed object.

In the step S508 shown in FIG. 5, the mobile terminal 100 can display the image having the highest resolution value in the set ROI for example. On the other hand, the mobile terminal 100 according to an embodiment of the present invention can control an image having a lowest resolution value in a set ROI to be displayed. This is described in detail with reference to FIGS. 15A to 15C as follows.

Figure 15A:
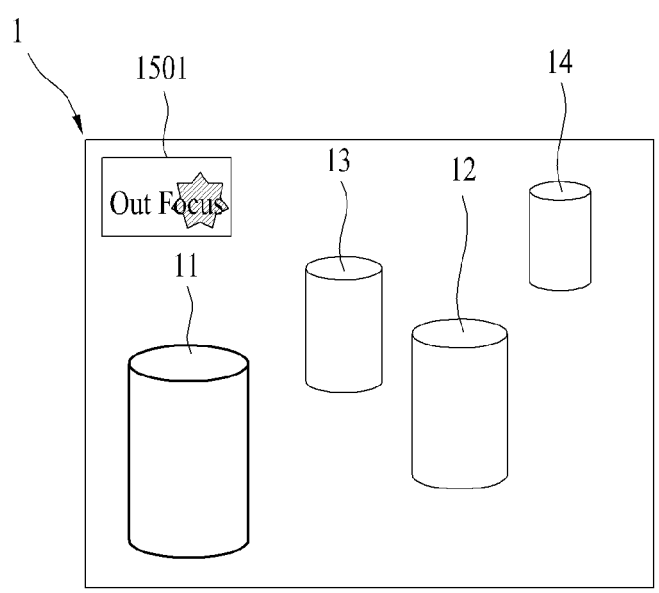
FIGS. 15A to 15C are diagrams illustrating one example to describe a process for creating an out-of-focus image having lowest resolution in all of a plurality of interesting regions set in a representative image.
Figure 15B:
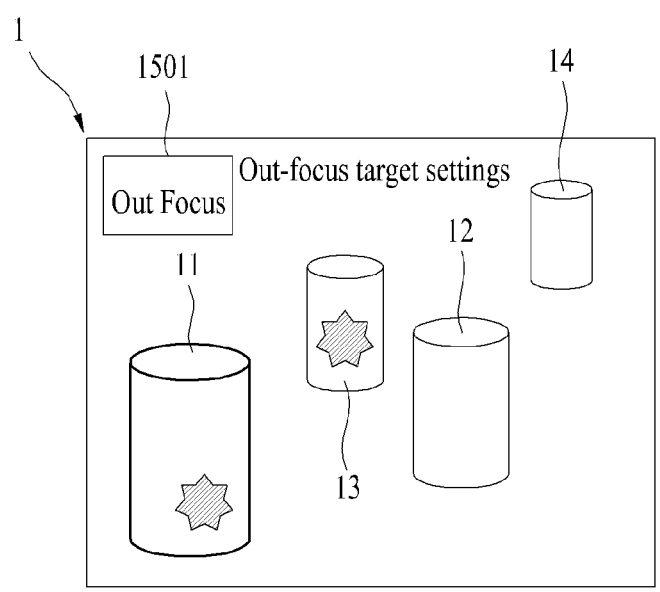
Figure 15C:
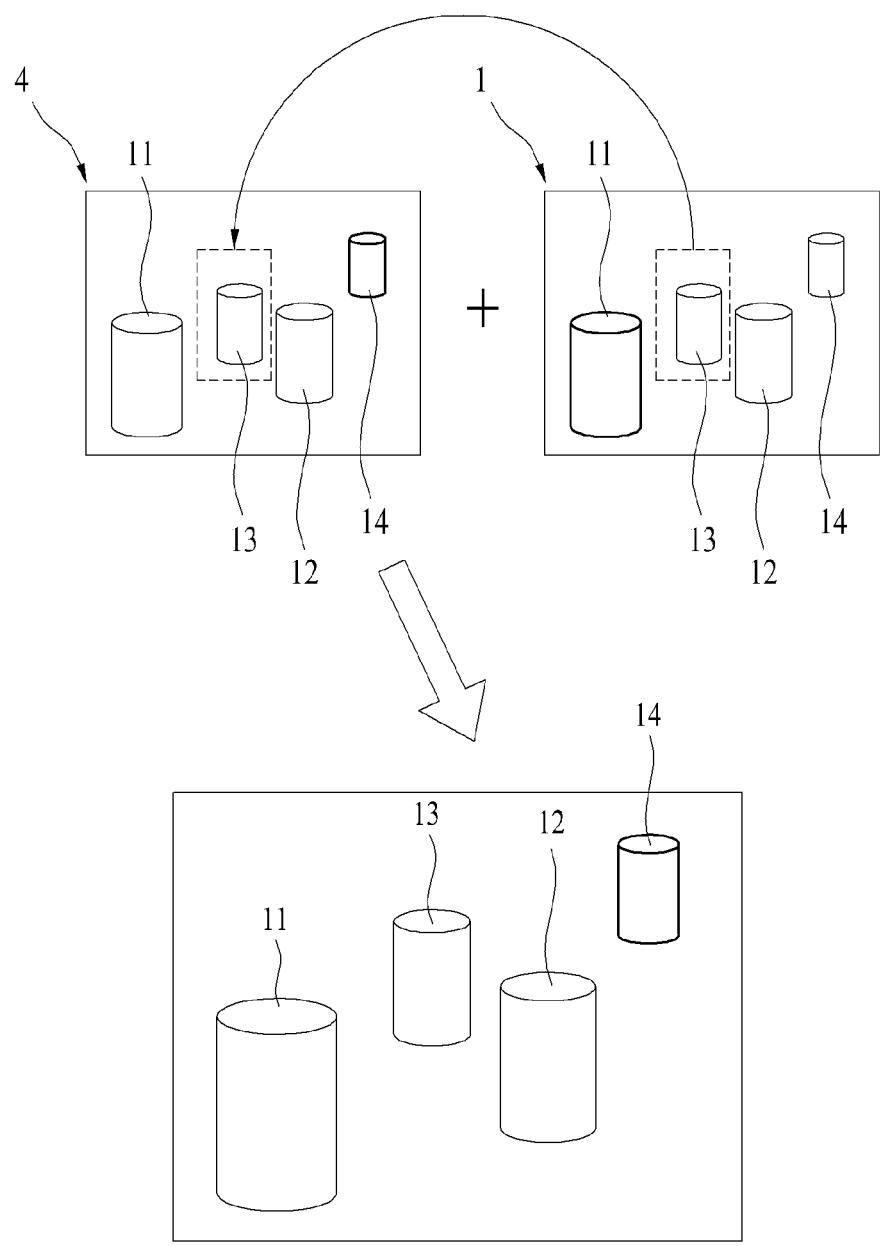

FIGS. 15A to 15C are diagrams illustrating one example to describe a process for creating an out-of-focus image having lowest resolution in all of a plurality of interesting regions set in a representative image. For clarity, assume that a plurality of photographed images include the 4 photographed images 1 to 4 described with reference to FIG. 7.

Referring to FIG. 15A, while a representative image is output via the touchscreen 151, if a user selects a 'Out Focus' button 1501, the controller 180 can enter a standby mode for waiting for a user's touch input. Subsequently, if the user selects a region to give an out-of-focus effect thereto, the controller 180 can control an image, in which all regions selected by the user are out of focus, to be displayed.

If there is one region to which the out-of-focus effect will be given, a photographed image having a lowest resolution in a selected region may be displayed. On the other hand, referring to FIG. 15B, if the out-of-focus effect is intended to be given to a plurality of regions, the controller 180 can create an out-of-focus image by combining at least two images together.

For instance, referring to FIG. 15B, when a touch input is applied to each of the first object 11 and the third object 13, the controller 180 extracts the photographed image having the lowest resolution value for the first object 11 and the photographed image having the lowest resolution value for the third object 13 and can then control an out-of-focus image, in which the selected regions are out of focus, to be displayed by synthesizing the extracted photographed images together.

If the photographed image having the lowest resolution value for the first object 11 and the photographed image having the lowest resolution value for the third object 13 include the fourth photographed image 4 and the first photographed image 1, respectively, referring to FIG. 15C, the controller 180 can create an out-of-focus image, in which each of the first object 11 and the third object 13 has the lowest resolution value, by combining the fourth photographed image 4 and the first photographed image 1 together.

In the above descriptions with reference to FIG. 12, FIG. 13 and FIG. 15, after a photographed image having a highest or lowest resolution value for a set ROI has been extracted, the image synthesis is performed by taking one of the extracted photographed images as a basic image. However, unlike the above descriptions with reference to FIG. 12, FIG. 13 and FIG. 15, it is not necessary for one of the extracted images to be set as a basic image.

Even if a photographed image does not have a highest or lowest resolution value for a set ROI, it can be utilized as a basic image that becomes a basis of the image synthesis. For instance, in the example shown in FIG. 12, the controller 180 can set the basic image to the representative image (i.e., the first photographed image 1) not focused on the second object 12 or the third object 13. In this instance, the controller obtains an image for the second object 12 and image for the third object 13 from the second photographed image 2 and the third photographed image, respectively and then controls a multi-focus image to be created by pasting the obtained images to the representative image.

The mobile terminal 100 according to an embodiment of the present invention can create a 3D image based on a plurality of photographed images. In particular, the controller 180 can create a 3D image by calculating backwards a distance between the camera 121 and a photographed object based on a resolution value of each of a plurality of the photographed images and then creating a left-eye image and a right-eye image in accordance with the calculated distance. This is described in detail with reference to FIGS. 16A to 16D as follows.

FIGS. 16A to 16D are diagrams illustrating one example to describe a process for creating a 3D image based on a plurality of photographed images. For clarity, assume that a plurality of photographed images include the 4 photographed images described with reference to FIG. 7.

Figure 16A:
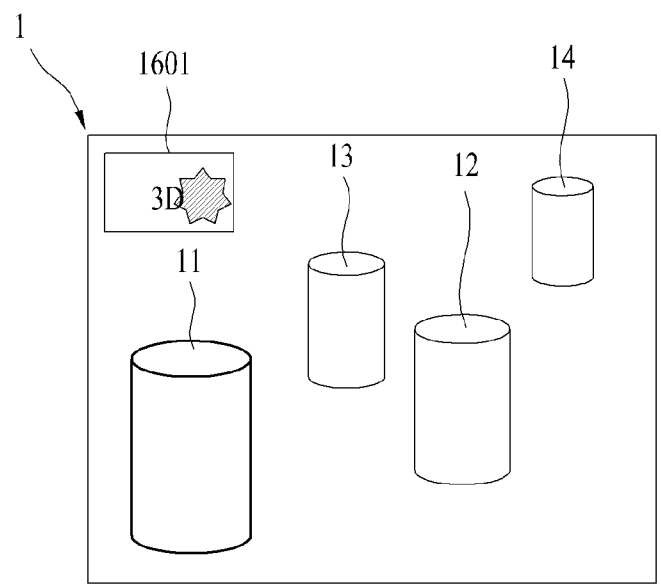
FIGS. 16A to 16D are diagrams illustrating one example to describe a process for creating a 3D image based on a plurality of photographed images.
Figure 16B:
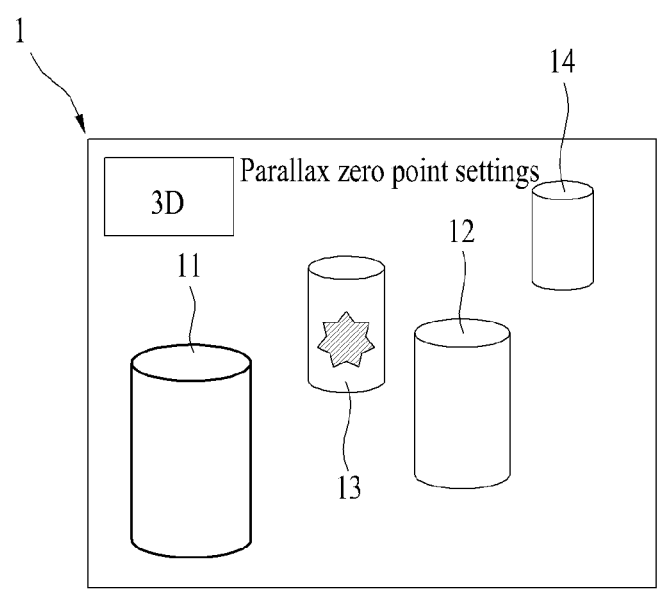

Referring to FIG. 16A and FIG. 16B, while a representative image is output via the touchscreen 151, if a user selects a '3D' button 1601 and then applies a touch input to a prescribed point, the controller 180 can set the touch input applied point to a parallax zero point. In this instance, the parallax zero point is the point that becomes a reference for determining a part to be set as a projected region (or a negative region) and a part to be set as a recessed region (or a positive region). In addition, the controller 180 can set the projected region and the recessed region with reference to a vertical distance between the mobile terminal 100 and an object located at the parallax zero point.

For instance, if a vertical distance between a random object and the mobile terminal 100 is smaller than a vertical distance between an object located at the parallax zero point and the mobile terminal 100, the controller 180 can set the projected region to a displayed region of the random object in a 3D image. On the contrary, if a vertical distance between a random object and the mobile terminal 100 is greater than a vertical distance between an object located at the parallax zero point and the mobile terminal 100, the controller 180 can set the recessed region to a displayed region of the random object in a 3D image.

Figure 16C:
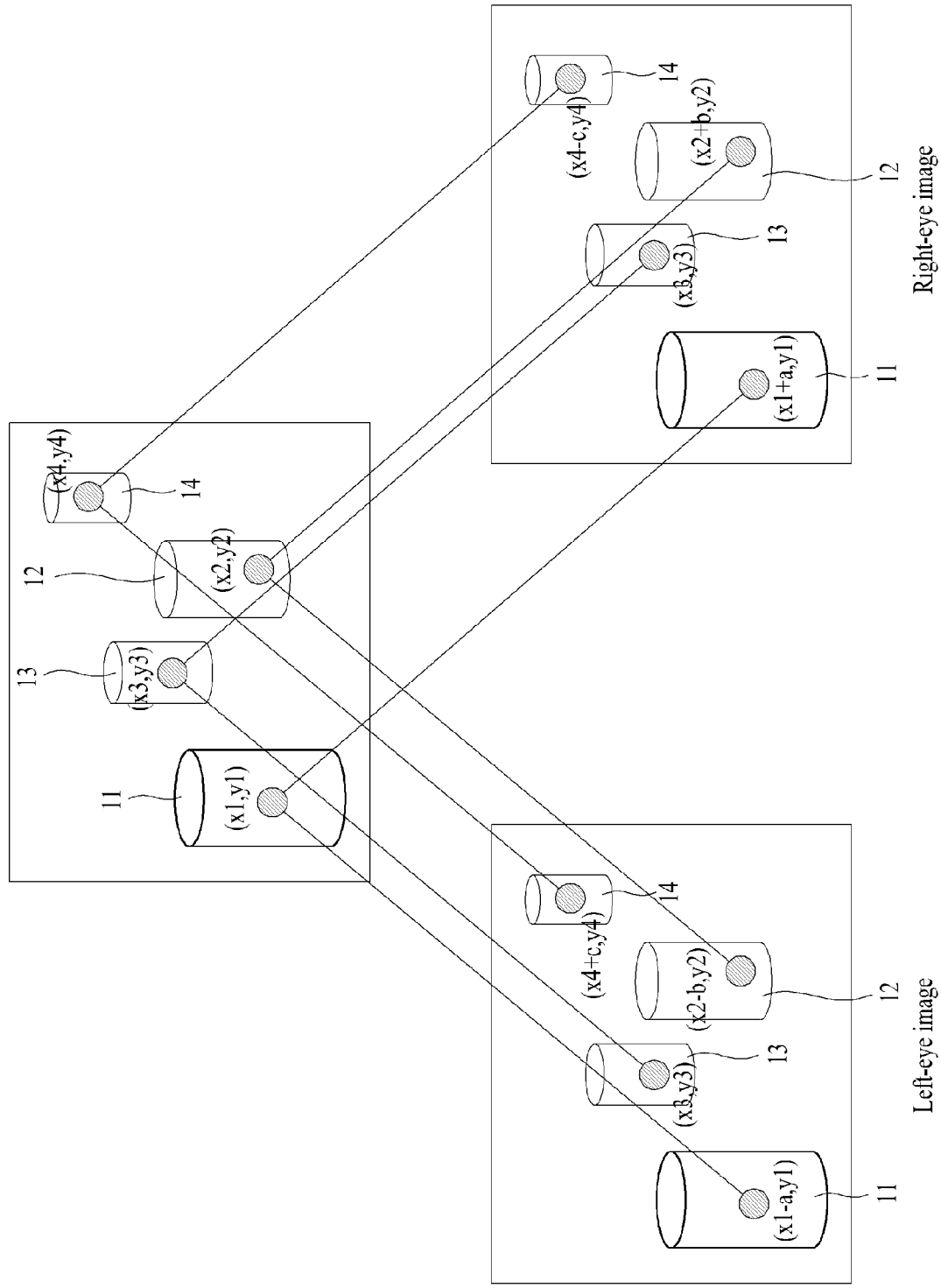

Referring to FIG. 16C, since the third object 13 to which the user's touch input is applied is located at the parallax zero point in FIG. 16B, a projected or recessed effect may not be applied to a 3D image creation. Hence, when a left-eye image and a right-eye image are created, the controller 180 controls the third object 13 to be displayed on the same coordinates, thereby controlling the 3D effect not to be applied to the third object 13.

On the other hand, when the second object 12 and the first object 11, since each of the second object 12 and the third object 13 is located closer to the mobile terminal 100 than the third object 13 (i.e., a vertical distance from the mobile terminal is shorter than that of the third object 13), a projected effect may be applied to a 3D image creation. Comparing the first object 11 and the second object 12 to each other, a more projected effect may be applied to the first object 11 located closer to the camera 121 than the second object 12. In order to give the projected effect to each of the first object 11 and the second object 12, the controller 180 can control x-axis values of the coordinates for displaying the first object 11 and the second object 12 to be set different from each other in the left-eye image and the right-eye image, respectively.

For instance, the first object 11 displayed centering on the coordinates (x1, y1) is controlled to be displayed at the coordinates (x1−a, y1) (where 'a' is a positive number) in the left-eye image and the coordinates (x1+a, y1) in the right-eye image, thereby controlling the projected effect to be applied to the first object 11. Simultaneously, the second object 12 displayed centering on the coordinates (x2, y2) is controlled to be displayed at the coordinates (x2−b, y2) (where 'b' is a positive number) in the left-eye image and the coordinates (x2+b, y2) in the right-eye image, thereby controlling the projected effect to be applied to the second object 12. In this instance, since the projected effect applied to the first object 11 is greater than that applied to the 2 nd object 12, a relation of 'a>b' can be established.

On the contrary, the recessed effect may be applied to the fourth object 14 located farther from the camera 121 than the third object 13 (i.e., a vertical distance from the mobile terminal 100 is longer than that of the third object 13) instead of the projected effect. Hence, the controller 180 controls the fourth object 14 displayed centering on the coordinates (x4, y4) to be displayed at the coordinates (x4−c, y4) (where 'c' is a positive number) in the left-eye image and the coordinates (x4+c, y4) in the right-eye image, thereby controlling the recessed effect to be applied to the fourth object 14.

Moreover, the controller 180 sets a part corresponding to a background in a photographed image to have the same coordinates in a left-eye image and a right-eye image, thereby controlling the part not to be set to a projected or recessed region. A distance from a photographed object can be judged from the EXIF data mentioned in the foregoing description. Since a spaced distance from a subject in focus can be included in the EXIF data, it can judge a distance between a parallax zero point and a photographed image.

Even if a spaced distance from a subject in focus is not saved in the EXIF data, it can calculate a distance from the subject in focus using a focal distance and a maximum resolution value, which are recorded in the EXIF data, at the moment of a corresponding photographing.

In the example shown in FIG. 16, it may be unnecessary to fix projected/recessed levels of photographed objects (i.e., depth levels of 3D image) thereto. The controller 180 can increase/decrease the projected or recessed levels of the photographed objects in response to user's settings. In particular, the values 'a', 'b' and 'c' mentioned in the foregoing description with reference to FIG. 16C are not fixed and are modifiable by user's settings.

Figure 16D:
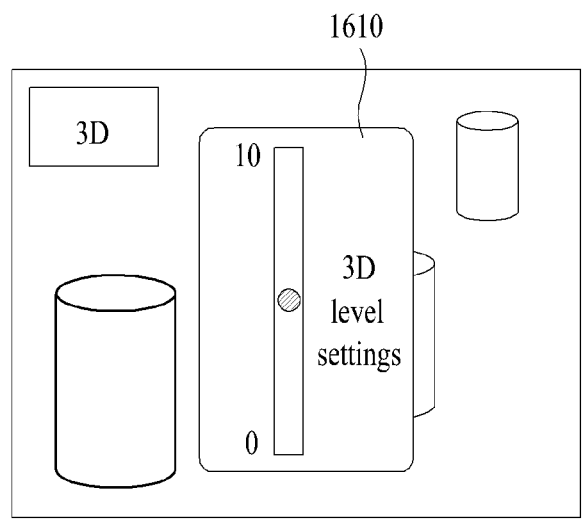

FIG. 16D shows one example of a setting screen for adjusting a depth level of a 3D image. Referring to FIG. 16D, after the parallax zero point has been set or the left-eye image and the right-eye image have been created in the example shown in FIG. 16B, the controller 180 can control a 3D depth setting menu 1610 to be displayed based on a user manipulation.

Through the setting screen exemplary shown in FIG. 16D, the controller 180 enables a depth of a 3D image to be manually adjusted. In the example shown in FIG. 16D, if the 3D effect is set to a higher level, the controller 180 can control a projected or recessed level of a photographed object to be further increased. In particular, in the example shown in FIG. 16D, if the 3D effect is set to a higher level, the value of a/b/c mentioned in the foregoing description with reference to FIG. 16C can further increase.

Referring now to FIG. 5, if the controller 180 determines that the focus adjustment is completed based on a user command indicating that the focus adjustment has been completed (S509), the controller 180 can control the rest of the images except the displayed photographed image to be deleted from the memory (S510). For instance, in the example shown in FIG. 10, while at least one of the first to fourth photographed images 1 to 4 is being displayed, if the user command indicating that the focus adjustment has been completed is input, the controller 180 deletes the rest of the images except the currently displayed image from the memory 160, thereby enhancing storage capacity of the mobile terminal 100.

While the synthetic image (e.g., multi-focus image, all-focus image, 3D image, etc.) created from synthesizing two photographed images together like FIGS. 11 to 16, is being displayed, if a user command indicating that the focus adjustment has been completed is input, it can control all the photographed images to be deleted except the synthetic image.

In the example shown in FIG. 5, if a plurality of the photographed images are created, the controller 180 automatically selects a representative image and then displays the selected representative image. However, it may not be necessary for the mobile terminal 100 according to an embodiment of the present invention to automatically select the representative image. Alternatively, the controller 180 can select one of a plurality of photographed images as a representative image based on a user's selection. This is described in detail with reference to FIGS. 17A to 17H as follows.

Figure 17A:
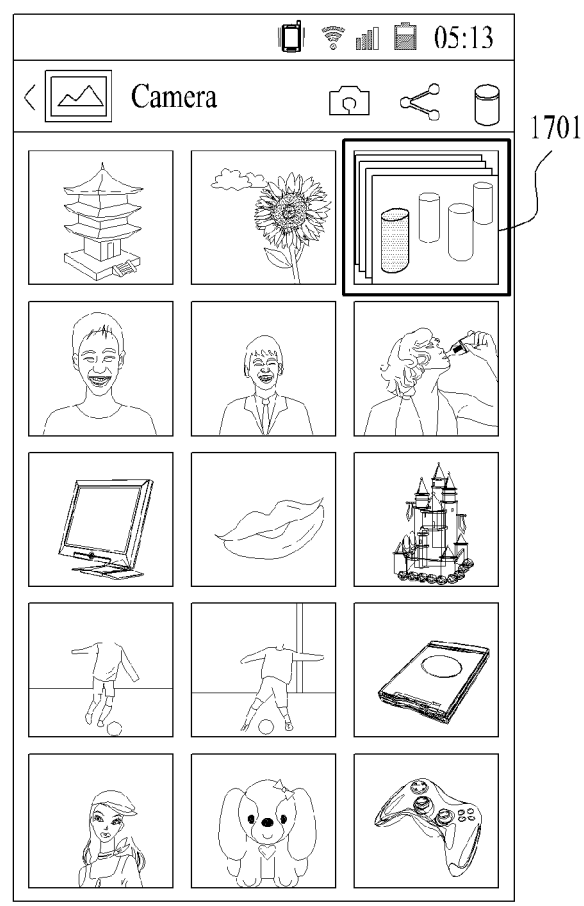
FIGS. 17A to 17H are diagrams illustrating one example of an output in gallery mode.

FIGS. 17A to 17H are diagrams illustrating one example of an output in gallery mode. Referring to FIG. 17A, if a user applies a command for entering a gallery mode to watch photos saved in the memory 160 of the mobile terminal 100, the controller can provide a photo file saved in the memory 160 together with thumbnails. In providing thumbnails of a plurality of photographed images photographed in multi-focusing photographing mode, the controller 180 can control the thumbnails of a plurality of the photographed images to have a step structure 1701 in which the thumbnails are stacked on each other.

By controlling the thumbnails of a plurality of the photographed images to have the step structure 1701, the controller 180 can control a plurality of the photographed images photographed in the multi-focusing photographing mode to be discriminated from photographed images photographed in normal photographing mode. In particular, unlike the photographed images photographed in the normal photographing mode, since a plurality of the photographed images photographed in the multi-focusing photographing mode are displayed by a plurality of the thumbnails are stacked on each other, a plurality of the photographed images photographed in the multi-focusing photographing mode and the photographed images photographed in the normal photographing mode can be easily discriminated from each other.

Figure 17B:
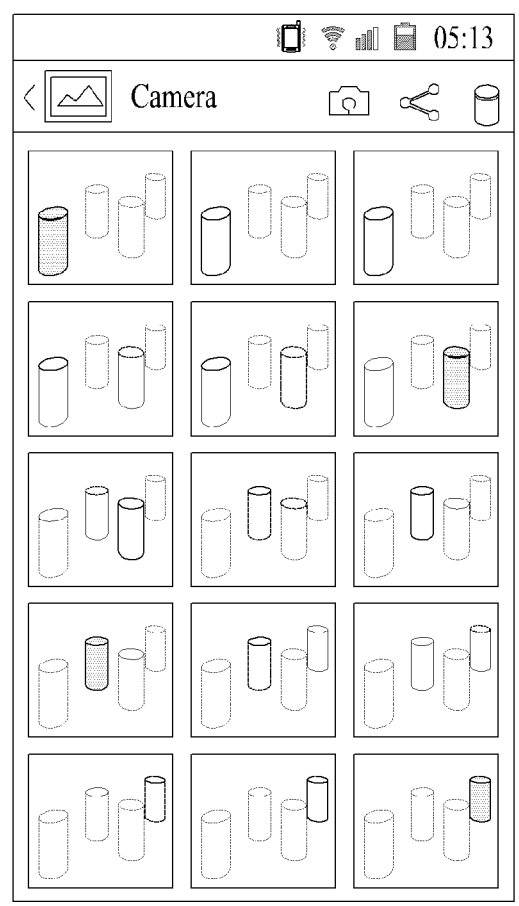
Figure 17C:
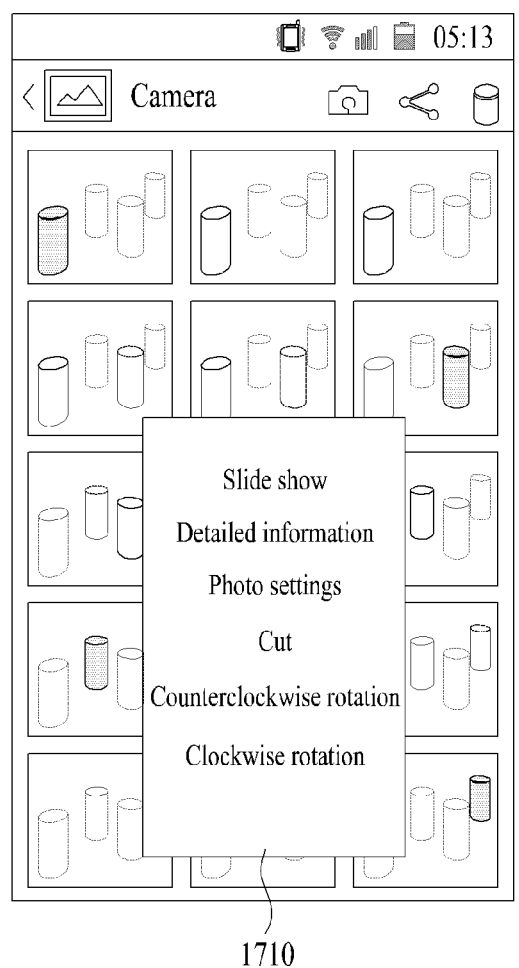
Figure 17D:
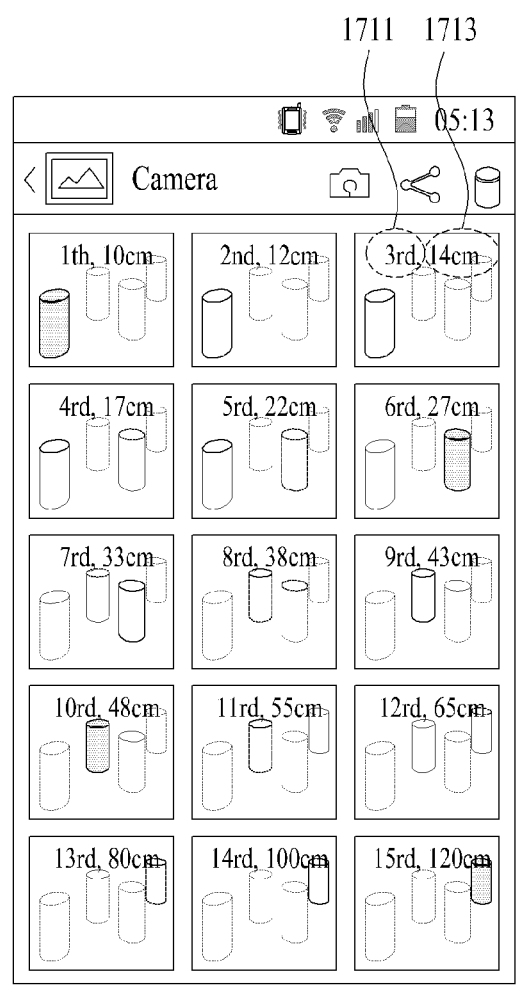
Figure 17E:
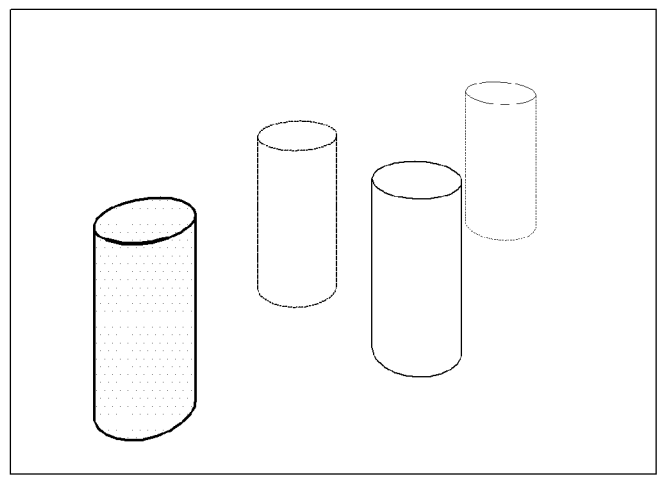
Figure 17F:
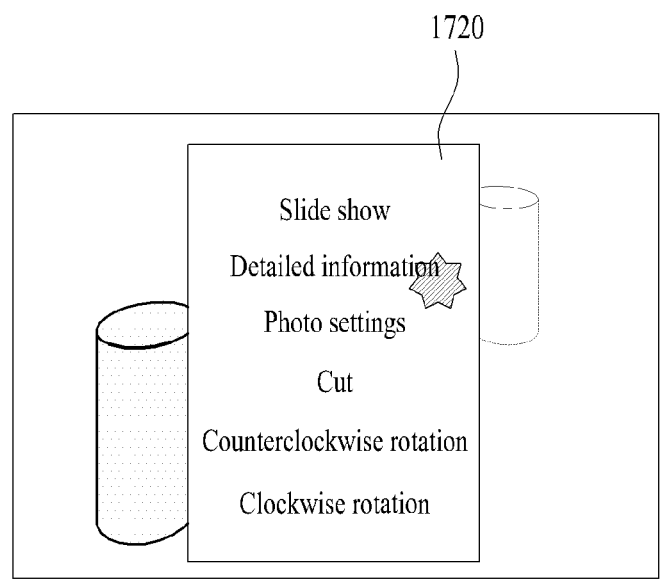
Figure 17G:
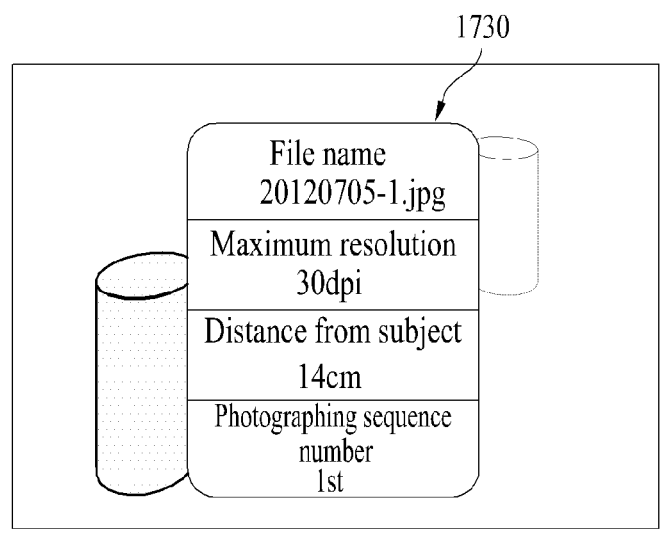
Figure 17H:
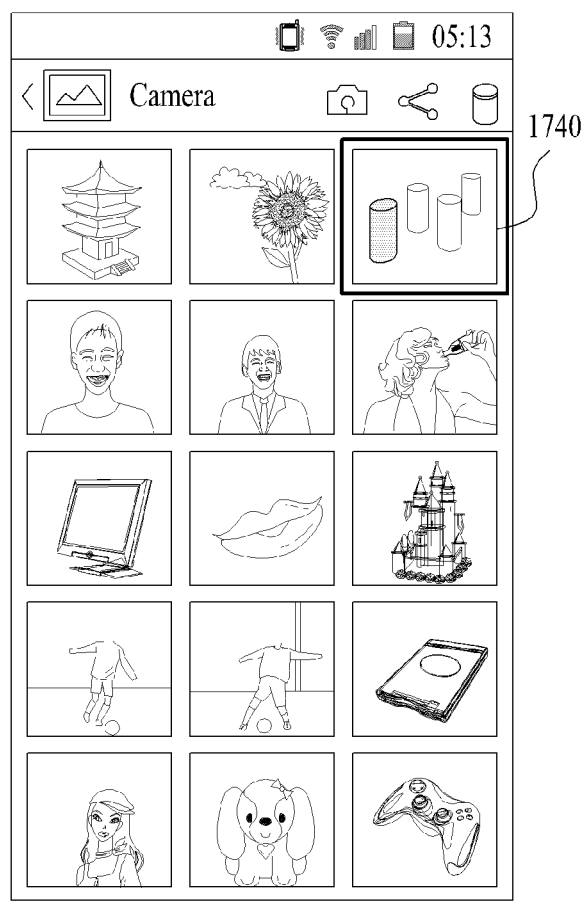

Referring to FIG. 17B, if a user command is input to the thumbnails of the step structure 1701 (e.g., the thumbnail of the step structure is touched), the controller 180 spreads a plurality of the thumbnails stacked in the step structure 1701 to control the thumbnails of a plurality of the photographed images to be displayed as a list. Subsequently, if the user selects one of a plurality of the thumbnails displayed as the list, the controller 180 can display the photographed image corresponding to the selected thumbnail as a representative image.

In doing so, in order to help the user to select the representative image, the controller 180 can control EXIF data of each of a plurality of the photographed images to be displayed. For instance, if an appropriate user command is input in the example shown in FIG. 17B, the controller 180 can control a menu screen 1710 shown in FIG. 17C to be displayed. If 'detailed information' item is selected from the menu screen 1710 shown in FIG. 17C, referring to FIG. 17D, the controller 180 can control the EXIF data of each of the photographed images to be displayed on the corresponding thumbnail. In the example shown in FIG. 17D, the EXIF data including a sequence number 1711 of the photographed image and a spaced distance 1713 from a subject in focus is displayed.

For another example, while one of a plurality of the photographed images is displayed as a representative image, the controller 180 can control EXIF data of the representative image to be displayed in response to a user command. For instance, referring to FIG. 17E, while one of a plurality of the photographed images is displayed as a representative image, if a user command is input (e.g., the representative image is long pressed), referring to FIG. 17F, the controller 180 can control a menu screen 1720 to be displayed. If 'detailed information' item is selected from the menu screen shown in FIG. 17F, referring to FIG. 17G, the controller 180 can control the EXIF data of the representative image to be displayed. In the example shown in FIG. 17G, a file name, a maximum resolution value of a photographed image, a distance from a subject having a maximum resolution value and a photographed sequence number are provided.

Like the example shown in FIG. 17, the controller 180 can select one of a plurality of the photographed images as a representative image based on a user input. Moreover, the controller 180 can control EXIF data of each of a plurality of the photographed images to be displayed.

As mentioned in the foregoing description of the step S509 and the step S510, if the focus adjustment is determined as completed by the user's command, the controller 180 can delete the rest of the images from the memory 160 except the displayed image. After the rest of the images have been deleted, if the gallery mode is re-entered, referring to FIG. 17H, the controller 180 can control a thumbnail 1740 of the finally selected image to be displayed by avoiding the thumbnail view of the step structure 1701 shown in FIG. 17A. In the example shown in FIG. 17, a prescribed photographed image selected by a user from a plurality of photographed images is selected as a representative image.

According to another embodiment of the present invention, the controller 180 can select a representative image based on a user input applied before the photographing command is input (S504). This is described in detail with reference to FIGS. 18A to 18D as follows.

Figure 18A:
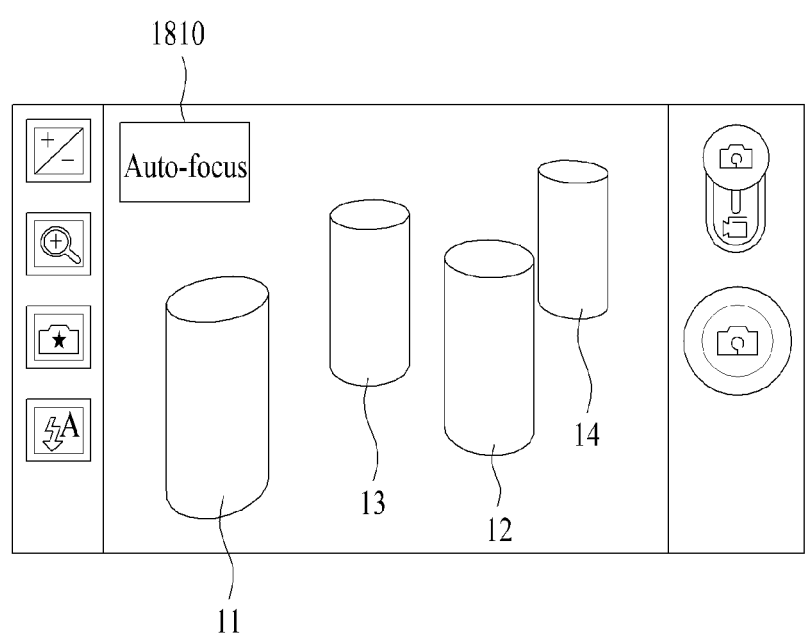
FIGS. 18A to 18D are diagrams illustrating one example to describe a process for selecting a representative image based on a user input before applying a photographing command.

FIGS. 18A to 18D are diagrams illustrating one example to describe a process for selecting a representative image based on a user input before applying a photographing command. Referring to FIG. 18A, if a multi-focusing photographing mode is entered, the controller 180 displays a preview image for surroundings and can control an auto-focus button 1810 to be displayed.

Figure 18B:
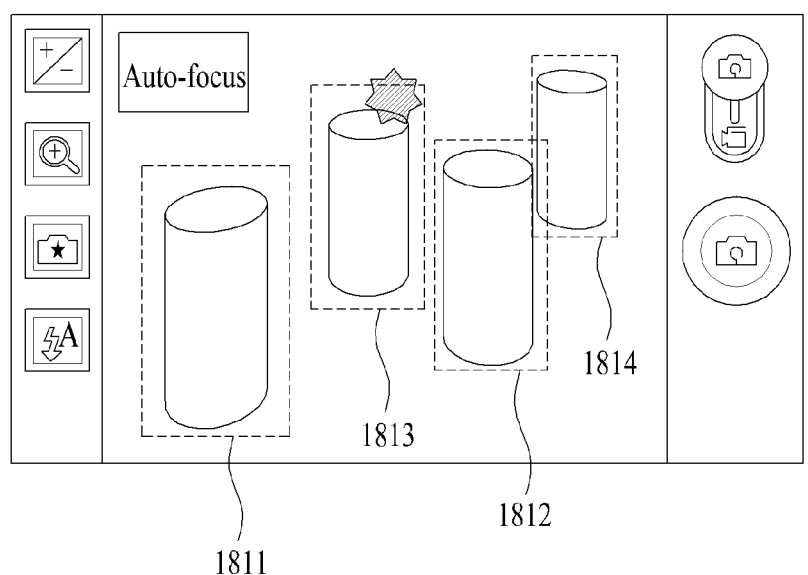
Figure 18C:
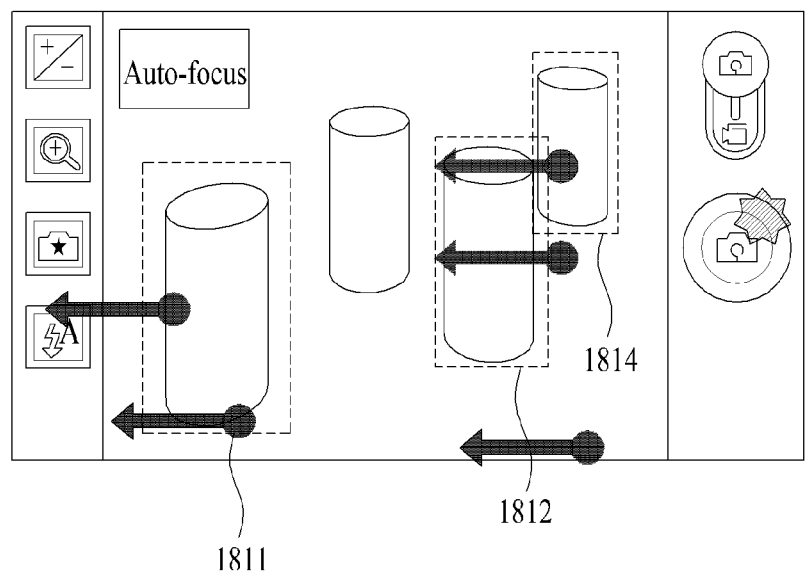

If a user selects the auto-focus button 1810 shown in FIG. 18A, the controller 180 recognizes objects (e.g., first to fourth objects 11 to 14 in FIG. 18A) in the preview image, selects the recognized objects, and then controls the selected objects to be displayed by being visually discriminated (e.g., in FIG. 18B, dotted outlines 1811 to 1814 are displayed around the first to fourth objects 11 to 14, respectively). While the discriminated objects 11 to 14 are displayed, the user can select or unselected each of the objects in the preview image using a touch input. For instance, referring to FIG. 18B, if a touch input is applied to the third object 13, the controller 180 can control the third object 13 to be unselected. If so, referring to FIG. 18C, the dotted outline 1813 of the third object 13 has disappeared.

Figure 18D:
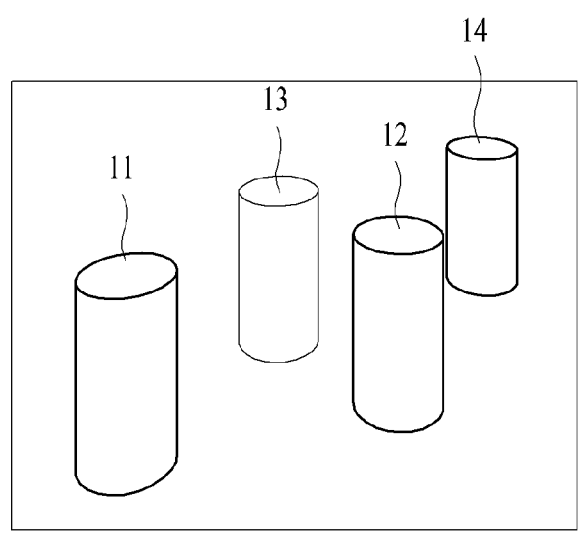

Thereafter, if the user inputs a photographing command, the controller 180 selects an image focused on the selected object(s) as a representative image and then controls the representative image to be displayed. For instance, if the photographing command is input (e.g., a photographing button is touched) while the first, second and fourth objects 11, 12 and 14 are selected (FIG. 18C), the controller 180 can control a multi-focus image, which is focused on the first, second and fourth objects 11, 12 and 14, to be displayed as the representative image (FIG. 18D). A process for creating the multi-focus image is already described with reference to FIG. 12, of which details will be omitted from the following description.

When the photographing command is applied, if there is one selected object only, the controller 180 may control a photographed image, which is focused on the selected object, among a plurality of the photographed images to be displayed as the representative image.

If a photographing command is input in multi-focusing photographing mode, it can create more photographed images than those created when applying a photographing mode in normal photographing mode. For instance, if 20 photographed images differing from each other in focal distance are created in multi-focusing photographing mode, it may need a storage space 20 times greater than that in a normal photographing mode.

In order to solve the problem of the excessive occupancy of the memory 160 due to the creation of a plurality of photographed images in multi-focusing photographing mode, if a plurality of the photographed images are created, the controller 180 deletes insignificant photographed image(s) among a plurality of the photographed images, targets significant photographed image(s) only, and then controls a focus correction process (i.e., the steps S506 to S511 shown in FIG. 5) to proceed. In particular, the controller 180 may control a photographed image, which has an object or region of a resolution value higher than that of the rest of the photographed images, to be saved.

For instance, as mentioned in the foregoing description with reference to FIG. 8, when 4 objects are included in the photographed image, the controller 180 saves the photographed image having a best resolution for the first object 11, the photographed image having a best resolution for the second object 12, the photographed image having a best resolution for the third object 13 and the photographed image having a best resolution for the fourth object 14 among a plurality of the photographed images and can delete the rest of the images. In this instance, the post-focal correction process may be performed using maximum 4 photographed images.

For another instance, as mentioned in the foregoing description with reference to FIG. 9, when a photographed image is partitioned into 16 regions, the controller saves an image having a maximum resolution in each of the regions and can delete the rest of the image. So to speak, if one of a plurality of photographed images does not have a part having a best resolution value in any regions compared to those of the rest of the photographed images, the controller 180 deletes the corresponding photographed image from the memory 160 and may control the focus correction process to proceed. In this instance, the post-focus correction process can be performed using maximum 16 photographed images.

In order to determine whether a photographed image has an object or region of which resolution value is higher than those of the rest of the photographed images, the controller 180 can use EXIF data associated with each photographed image. In particular, the controller 180 compares a resolution value for each object included in the EXIF data (cf. FIG. 8) or a resolution value for each region included in the EXIF data (cf. FIG. 9), thereby determining whether the corresponding photographed image has an object or region of which resolution value is higher than those of the rest of the photographed images.

However, the step S511 of deleting the rest of the image in FIG. 5 may not be mandatory. In some cases, the present invention can be performed by skipping the step S511 of deleting the rest of the image in FIG. 5.

For example, as mentioned in the foregoing description with reference to FIG. 4, the mobile terminal 100 according to an embodiment of the present invention extracts a photographed image having a best resolution value for an object or region selected by a touch input. If this example is further applied, the controller 180 can extract a photographed image having a best brightness for an object or region selected by a touch input. In order to extract the photographed image having the best brightness for the object or region selected by the touch input, a histogram may be recorded in EXIF data. The controller 180 extracts color values (e.g., RGB, YCbCr, YUV, etc.) for the object or region selected by the touch input from the histogram recorded in the EXIF data and can then extract a photographed image having a best brightness for the object or region selected by the touch input.

Accordingly, embodiments of the present invention provide several advantages. First of all, the present invention can provide a mobile terminal enhancing facilitation of user's manipulation.

Secondly, the present invention can provide a mobile terminal capable of displaying a photographed image focused on a user-selected subject after completion of a photographing. Thirdly, the present invention can provide a mobile terminal capable of creating a 3D image based on a photographed picture. Finally, in creating a 3D image, a mobile terminal according to an embodiment of the present invention can provide an effect of enabling a user to freely adjust a parallax zero point.

It will be appreciated by those skilled in the art that the present invention can be specified into other form(s) without departing from the spirit or scope of the inventions.

In addition, the above-described methods (or operation flowchart) can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:
1. A mobile terminal comprising:
a camera;
a touchscreen; and
a hardware-embedded controller configured to:
 display a preview image input by real time via the camera in a multi-focus photographing mode,
 recognize a first number of objects in the preview image,
 in response to selection of at least two of the first number of objects in the preview image, display the selected objects such that the selected objects are visually discriminated in the preview image, in response to reception of a photographing command, photograph a second number of images via the camera, wherein the second number is larger than the first number, display a multi-focus image as a representative image, wherein the multi-focus image is created by synthesizing at least two of the second number of the photographed images together, the at least two images having an optimum resolution for the selected objects, respectively, automatically save a first number of images only among the second number of photographed images, the first number of images having an optimum resolution for the first number of objects, respectively, receive a first touch input applied while the representative image is displayed, extract an image having an optimum resolution for an object selected by the first touch input from the first number of the images, such that the rest of the first number of the images except the extracted image are automatically deleted, and display the extracted image via the touchscreen.

2. The mobile terminal of claim 1, wherein the controller is further configured to consecutively photograph the second number of the images by differing from each other in focal distance.

3. The mobile terminal of claim 2, wherein the controller is further configured to create each of the second number of photographed images while moving a lens of the camera in a direction of an optical axis each time the lens of the camera arrives at a preset position.

4. The mobile terminal of claim 1, wherein the controller is further configured to create EXIF (Exchangeable Image File Format) data of each of the first number of the images.

5. The mobile terminal of claim 4, wherein the EXIF data comprises resolution information of each of the first number of the images.

6. The mobile terminal of claim 5, wherein the resolution information includes information on recording a resolution value for each of the first number of objects.

7. The mobile terminal of claim 6, wherein the controller is further configured to compare the EXIF data of the first number of the images to each other and then extract the image having the optimum resolution for the object selected by the first touch input.

8. The mobile terminal of claim 4, wherein the controller is further configured to record the EXIF data in a header region each of the first number of photographed images.

9. The mobile terminal of claim 1, wherein if first and second objects are selected by the first touch input, the controller is further configured to extract a first photographed image having the optimum resolution in the first object and a second photographed image having the optimum resolution in the second object.

10. The mobile terminal of claim 9, wherein the controller is further configured to create a synthetic image from synthesizing the first photographed image and the second photographed image together to be displayed on the touchscreen.

11. The mobile terminal of claim 1, wherein if a character is included in at least one of the first number of the photographed images, the controller is further configured to extract an image having an optimum resolution for an object located at a point, at which the character gazes.

12. The mobile terminal of claim 11, wherein the controller is further configured to determine the character gazing point by applying an eye tracking algorithm.

13. The mobile terminal of claim 4, wherein the EXIF data further includes distance information on a distance between an object having a maximum resolution value and the camera.

14. The mobile terminal of claim 13, wherein the controller is further configured to create a 3D image based on the first number of the photographed images.

15. The mobile terminal of claim 14, wherein the controller is further configured to set an object selected by a second touch input as a parallax zero point.

16. The mobile terminal of claim 15, wherein the controller is further configured to crate the 3D image by applying a projected effect to an object located closer to the camera than the parallax zero point and applying a recessed effect to an object located farther from the camera than the parallax zero point.

17. A method of controlling a mobile terminal, the method comprising:

displaying, via a touchscreen of the mobile terminal, a preview image input by real time via a camera of the mobile terminal in a multi-focus photographing mode;

recognizing, via a hardware-embedded controller of the mobile terminal, a first number of objects in the preview image;

in response to selection of at least two of the first number of objects in the preview image, displaying, via the touchscreen of the mobile terminal, the selected objects such that the selected objects are visually discriminated in the preview image;

in response to reception of a photographing command, photographing, via the camera of the mobile terminal, a second number of images, wherein the second number is larger than the first number;

displaying, via the touchscreen of the mobile terminal, a multi-focus image as a representative image, wherein the multi-focus image is created from synthesizing at least two of the second number of the photographed images together, the at least two images having an optimum resolution for the selected objects, respectively;

automatically saving a first number of images only among the second number of photographed images, the first number of images having an optimum resolution for the first number of objects, respectively;

receiving, via the controller of the mobile terminal, a first touch input applied while the representative image is displayed;

extracting, via the controller, an image having optimum resolution for an object selected by the first touch input from the first number of images, such that the rest of the first number of the images except the extract image are automatically deleted; and displaying, via the touchscreen, the extracted image.

18. The method of claim 17, wherein the second number of the photographed images are consecutively photographed by differing from each other in focal distance.

19. The method of claim 18, further comprising:

creating, via the controller, each of the second number of the photographed images while moving a lens of the camera in a direction of an optical axis each time the lens of the camera arrives at a preset position.

20. The method of claim 17, further comprising:

creating, via the controller, EXIF (Exchangeable Image File Format) data of each of the second number of the photographed images.

* * * * *